US011422409B2

(12) United States Patent
Gollier et al.

(10) Patent No.: US 11,422,409 B2
(45) Date of Patent: Aug. 23, 2022

(54) BROADBAND OPTICAL DEVICE INCLUDING LIQUID CRYSTAL POLYMER FILMS

(71) Applicant: Meta Platforms Technologies, LLC, Menlo Park, CA (US)

(72) Inventors: Jacques Gollier, Sammamish, WA (US); Fenglin Peng, Redmond, WA (US); Junren Wang, Redmond, WA (US); Lu Lu, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 75 days.

(21) Appl. No.: 16/851,874

(22) Filed: Apr. 17, 2020

(65) Prior Publication Data
US 2020/0341315 A1 Oct. 29, 2020

Related U.S. Application Data

(60) Provisional application No. 62/838,890, filed on Apr. 25, 2019.

(51) Int. Cl.
*G02F 1/13363* (2006.01)
*G02B 5/30* (2006.01)

(52) U.S. Cl.
CPC ....... *G02F 1/13363* (2013.01); *G02B 5/3016* (2013.01); *G02F 1/133638* (2021.01); *G02F 2413/13* (2013.01); *G02F 2413/14* (2013.01)

(58) Field of Classification Search
CPC .......... G02F 1/13363; G02F 1/133631; G02F 1/133632; G02F 1/133633;
(Continued)

(56) References Cited

U.S. PATENT DOCUMENTS 9,298,041 B2 * 3/2016 Escuti ................. G02B 5/3083
10,955,600 B1 * 3/2021 Evans ..................... G02B 5/26
(Continued)

OTHER PUBLICATIONS

International Search Report and Written Opinion dated Sep. 7, 2020, in PCT Application No. PCT/US2020/029104, filed on Apr. 21, 2020 (13 pages).
(Continued)

*Primary Examiner* — Edward J Glick
*Assistant Examiner* — David Y Chung
(74) *Attorney, Agent, or Firm* — Millburn IP PLLC

(57) ABSTRACT

An optical waveplate is provided. The optical waveplate includes a first birefringent film including optically anisotropic molecules arranged to form a first twist structure. The optical waveplate also includes a second birefringent film including optically anisotropic molecules arranged to form a second twist structure, the second birefringent film being stacked with the first birefringent film. The optically anisotropic molecules at a first portion of the first birefringent film adjacent an interface between the first birefringent film and the second birefringent film are configured with a first azimuthal angle. The optically anisotropic molecules at a second portion of the second birefringent film adjacent the interface are configured with a second azimuthal angle. The first azimuthal angle is substantially the same as the second azimuthal angle.

18 Claims, 9 Drawing Sheets

(58) Field of Classification Search
CPC ......... G02F 1/133634; G02F 1/133635; G02F 1/133636; G02F 1/133637; G02F 1/133638; G02B 5/3016; G02B 5/3083
See application file for complete search history.

(56) References Cited

U.S. PATENT DOCUMENTS

| | | | |
|---|---|---|---|
| 2009/0122402 | A1 | 5/2009 | Shemo et al. |
| 2016/0033698 | A1 | 2/2016 | Escuti et al. |
| 2018/0101020 | A1* | 4/2018 | Gollier ............... G02B 27/0172 |
| 2018/0120579 | A1 | 5/2018 | Gollier et al. |

OTHER PUBLICATIONS

Shen S., et al., "Optimal design of achromatic true zero-order waveplates using twisted nematic liquid crystal," Journal of the Optical Society of America A, vol. 22, No. 5, May 1, 2005, pp. 961-965 (5 pages).

* cited by examiner

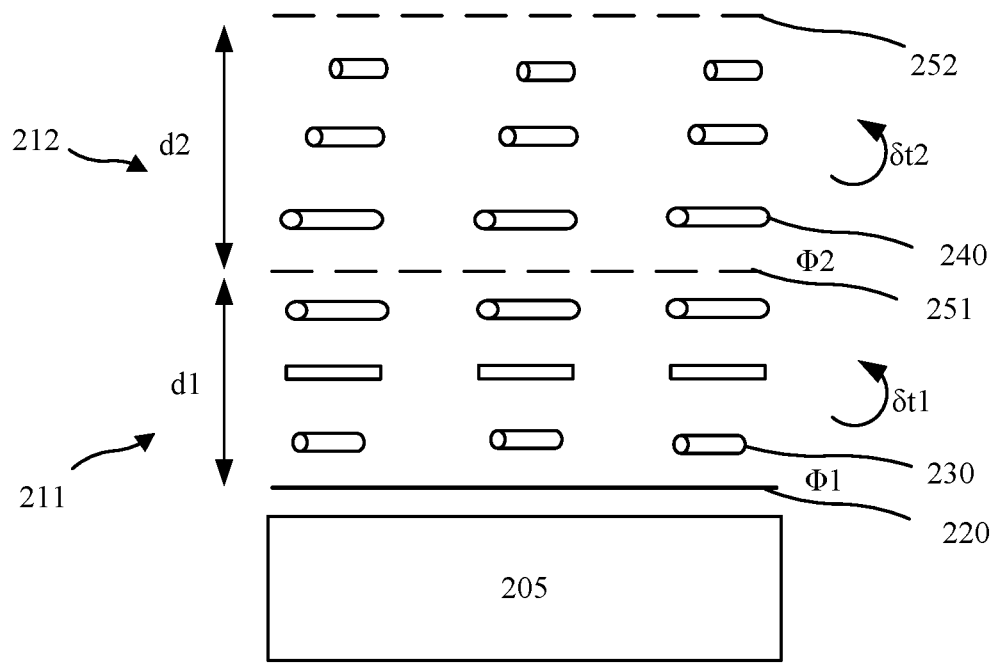
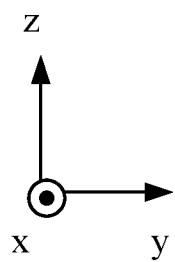
FIG. 2

BROADBAND OPTICAL DEVICE INCLUDING LIQUID CRYSTAL POLYMER FILMS

CROSS REFERENCE TO RELATED APPLICATION

This application claims the benefit of U.S. Provisional Application No. 62/838,890, filed on Apr. 25, 2019, which is incorporated by reference in its entirety.

TECHNICAL FIELD

The present disclosure generally relates to optical devices and, more specifically, to an optical device having a liquid crystal polymer coating.

BACKGROUND

Waveplates are key components in many instruments and optical systems for polarization control. A waveplate controls the polarization by retarding (or delaying) a component of polarization (or a polarization component) with respect to an orthogonal component. To enhance the performance of an optical system, broadband or achromatic waveplates covering wavelengths in a visible ("VIS") region, from the VIS region to near infrared ("NIR") region, are desirable.

SUMMARY

One aspect of the present disclosure provides an optical waveplate. The optical waveplate includes a first birefringent film including optically anisotropic molecules arranged to form a first twist structure. The optical waveplate also includes a second birefringent film including optically anisotropic molecules arranged to form a second twist structure, the second birefringent film being stacked with the first birefringent film. The optically anisotropic molecules at a first portion of the first birefringent film adjacent an interface between the first birefringent film and the second birefringent film are configured with a first azimuthal angle. The optically anisotropic molecules at a second portion of the second birefringent film adjacent the interface are configured with a second azimuthal angle. The first azimuthal angle is substantially the same as the second azimuthal angle.

Another aspect of the present disclosure provides an optical waveplate. The optical waveplate includes a first birefringent film configured with a first optic axis having a first spatially constant orientation. The optical waveplate also includes a second birefringent film configured with a second optic axis having a second spatially constant orientation. The optical waveplate further includes a third birefringent film configured with a third optic axis having a third spatially constant orientation. The first birefringent film, the second birefringent film, and the third birefringent film are stacked together. The first spatially constant orientation, the second spatially constant orientation, and the third spatially constant orientation are different from one another.

Another aspect of the present disclosure provides an optical lens assembly. The optical lens assembly includes a first optical element. The optical lens assembly also includes a second optical element optically coupled to the first optical element and configured to reflect a light of a first polarization received from the first optical element back to the first optical element, and transmit a light of a second polarization received from the first optical element. At least one of the first optical element or the second optical element is provided with a waveplate. The waveplate includes a first birefringent film including optically anisotropic molecules arranged to form a first twist structure. The waveplate also includes a second birefringent film including optically anisotropic molecules arranged to form a second twist structure, the second birefringent film being stacked with the first birefringent film. The optically anisotropic molecules at a first portion of the first birefringent film adjacent an interface between the first birefringent film and the second birefringent film are configured with a first azimuthal angle. The optically anisotropic molecules at a second portion of the second birefringent film adjacent the interface are configured with a second azimuthal angle. The first azimuthal angle is substantially the same as the second azimuthal angle.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings:

FIG. 2 illustrates a schematic diagram of an optical device, according to another embodiment of the disclosure;

DETAILED DESCRIPTION

Figure 1:
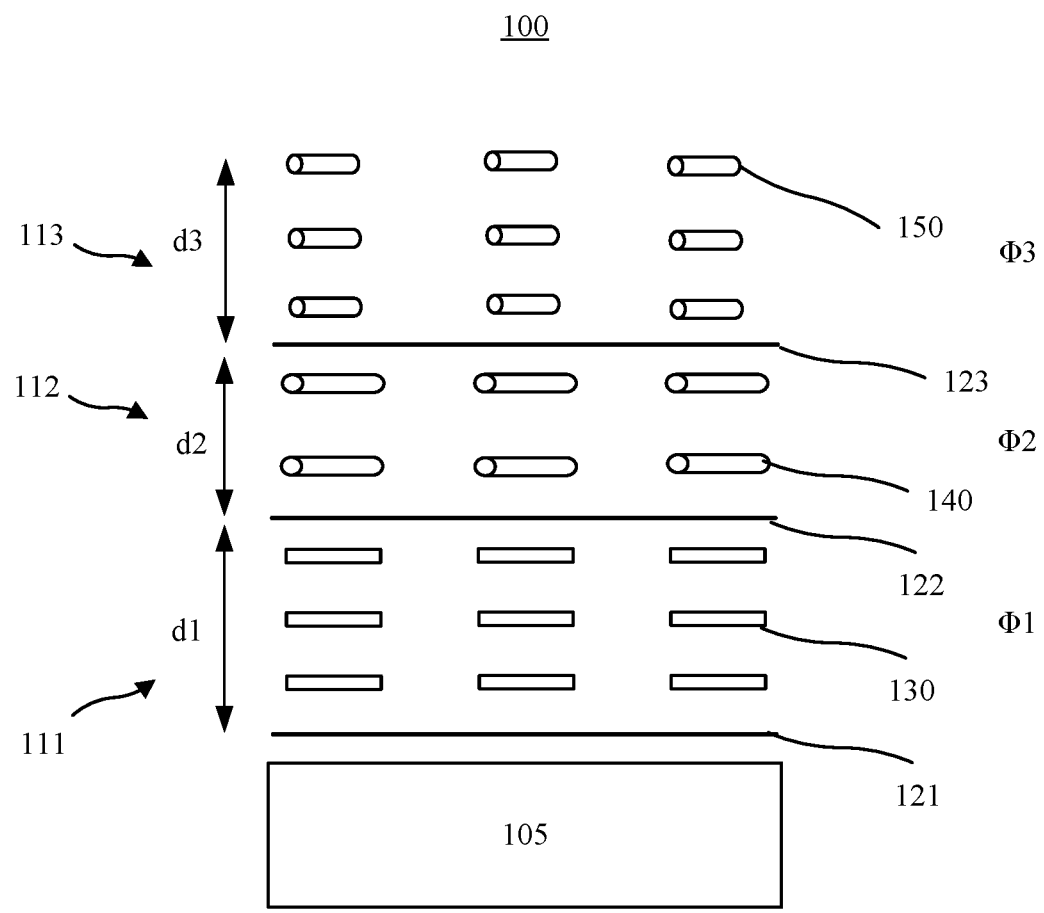
FIG. 1 illustrates a schematic diagram of an optical device, according to an embodiment of the disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or a combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

The wavelength ranges, spectra, or bands mentioned in the present disclosure are for illustrative purposes. The disclosed optical device, system, element, assembly, and method may be applied to a visible wavelength range, as well as other wavelength ranges, such as an ultraviolet ("UV") wavelength range, an infrared wavelength range, or a combination thereof The term "optical device" as used herein should be broadly interpreted to encompass all types of optical element, optical film, optical coating, optical layer, optical apparatus, optical system, optical assembly, waveplate, optical reflector, optical deflector, optical polarizer, etc.

The term "a design wavelength" refers to a wavelength for which an optical element is designed or configured to perform an optical function. The term "a design wavelength range" refers to a range of wavelengths for which the optical element is designed or configured to perform the optical function. The design wavelength is within the design wavelength range. The term "center wavelength of a design wavelength range" refers to a wavelength at the center value of the design wavelength range. The design wavelength may be at the center wavelength or may be a wavelength that is within a predetermined small range of the center wavelength range, such as −20% to +20%, −10% to +10%, −5% to +5%, −3% to +3%, or −2% to +2%, etc., which may be defined based on specific application. In some embodiments, the design wavelength may be any suitable wavelength within the design wavelength range, which may not be at or adjacent the center wavelength. In some embodiments, the design wavelength range may be a visible wavelength range (e.g., about 400 nm to about 700 nm), a near infrared wavelength range (e.g., about 700 nm to about 950 nm), or a visible-to-near infrared wavelength range (e.g., about 400 nm to about 950 nm), or some combination thereof. For example, when the design wavelength range is a visible wavelength range from 400 nm to 700 nm, the center wavelength may be 550 nm. In some embodiments, the center wavelength may be a wavelength within a predetermined small range around the center value 550 nm, such as 522.5 nm to 577.5 nm (including 522.5 nm and 577.5 nm) when the predetermined range is −5% to +5%.

Conventional achromatic waveplates are typically realized by physically laminating several retardation films and controlling a relative orientation of the retardation films. For example, a conventional achromatic quarter-wave plate typically includes a half-wave plate and a quarter-wave plate laminated together. The fabrication process for such an achromatic quarter-wave plate is complex and the fabrication cost is high. Further, attaching such an achromatic quarter-wave plate to an optical element of a high curvature is difficult due to challenges associated with laminating a flat film on a curved surface. The disclosed optical device having liquid crystal polymer coatings is directed to solve one or more disadvantages of the conventional optics technology.

The present disclosure provides an optical waveplate configured to provide a substantially constant retardance over a predetermined wavelength range, thereby achieving a broadband optical waveplate over the predetermined wavelength range. The optical waveplate may include a stack of multiple birefringent layers or films having twisted structures. In some embodiments, each birefringent layer or film may be configured with a non-zero twist angle. The twist angle represents a total amount of change (or rotation) in an in-plane orientation of an optic axis of the birefringent layer from a first side of the birefringent layer to an opposite side of the birefringent layer in the thickness direction. For discussion purposes, when the orientation of the optic axis is substantially spatially constant (e.g., the twist angle is zero) within the birefringent layer, the orientation of the optic axis may correspond to an azimuthal angle of optically anisotropic molecules included in the birefringent layer. An azimuthal angle of an optically anisotropic molecule may refer to an angle between a projection of a long axis of the optically anisotropic molecule onto a plane (e.g., an x-y plane) parallel to a substrate where the birefringent layer is disposed and a predetermined reference direction (e.g., an x-axis direction) within the plane. When the orientation of the optic axis is substantially spatially constant in a birefringent layer, the azimuthal angles of the optically anisotropic molecules are substantially the same, and can be represented by a single azimuthal angle. When the orientation of the optic axis of a birefringent layer is nonconstant (e.g., the twist angle is non-zero), i.e., spatially varying, the orientation of the optic axis varies (or changes) in space, for example, in the thickness direction of the birefringent layer. When the orientation of the optic axis varies (or changes) in space within the birefringent layer, the azimuthal angles of the optically anisotropic molecules change from the first side of the birefringent layer to the second side of the birefringent layer along the thickness direction.

In some embodiments, the optical waveplate may include at least three birefringent layers. Each of the at least three birefringent layers may be configured with an optic axis having a spatially constant orientation (e.g., twist angle is zero). Thus, there may be at least three spatially constant orientations, e.g., a first spatially constant orientation, a second spatially constant orientation, and a third spatially constant orientation. The first spatially constant orientation, a second spatially constant orientation, and a third spatially constant orientation may be different from one another. In some embodiments, the spatially constant orientation of the optic axis may correspond to an azimuthal angle of the uniformly oriented optically anisotropic molecules included in each birefringent layer. Thus, there may be at least three azimuthal angles corresponding to the optic axes of the at least three birefringent layers, e.g., a first azimuthal angle, a second azimuthal angle, and a third azimuthal angle. The first azimuthal angle, the second azimuthal angle, and the third azimuthal angle may be different from one another. The optical waveplate including at least three birefringent layers configured with optic axes having different spatially constant orientations may provide a substantially constant retardance over a design wavelength range (e.g., a broadband retardation effect). For embodiments where more than three birefringent layers are included, at least three spatially constant orientations of at least three optic axes of at least three birefringent layers may be different from one another. In some embodiments, all of the spatially constant orientations of the optic axes of the birefringent layers may be different from one another.

The present disclosure further provides an optical lens assembly including one or more of the disclosed optical waveplates. The optical lens assembly may include a first optical element. The optical lens assembly may include a second optical element optically coupled to the first optical element. The second optical element may be configured to reflect a light of a first polarization received from the first optical element back to the first optical element, and transmit a light of a second polarization received from the first optical element. One of the first optical element and the second optical element may be provided with a waveplate surface that is any one of the disclosed optical waveplates. The optical lens assembly may be implemented in an optical system, for example, a near-eye display ("NED") for virtual-reality ("VR"), augmented-reality ("AR"), and/or mixed-reality ("MR") applications.

FIG. 1 is a schematic diagram of an optical device 100. The optical device 100 may include a stack of a plurality of birefringent material layers (or birefringent layers or birefringent films). For illustrative purposes, three birefringent layers, a first birefringent layer 111, a second birefringent layer 112, and a third birefringent layer 113, are shown in the optical device 100.

The number of birefringent layers is not limited to three. In some embodiments, the number of birefringent layers may be 1, 2, 4, 5, 6, 7, etc. In some embodiments, each of the birefringent layers 111, 112, and 113 may be a thin film including one or more birefringent materials. The birefringent materials in the birefringent layers 111, 112, and 113 may include optically anisotropic molecules 130, 140, 150, respectively. For illustrative purposes, an optically anisotropic molecule is represented by a small rod in FIG. 1, where each rod is depicted as having a longitudinal axis (or a length direction axis) and a lateral axis (or a width direction axis). Each of the birefringent layers 111, 112, and 113 may have an optic axis, which is a direction in which a ray of transmitted light experiences no birefringence. The optic axis of a birefringent layer may also be referred to an optic axis of a birefringent material included in the birefringent layer. The optic axis of each of the birefringent layers 111, 112, and 113 may have a spatially constant orientation within the corresponding birefringent layer. The optic axes of the birefringent layers 111, 112, and 113 may be configured or arranged with different spatially constant orientations, such that the optical device 100 may provide a substantially constant retardance over a design wavelength range.

For example, as shown in FIG. 1, each of the birefringent layers 111, 112, and 113 may be presumed to include three sub-layers/portions (e.g., a bottom layer/portion, a middle layer/portion, and a top layer/portion) of optically anisotropic molecules, such as LC molecules. Take the first birefringent layer 111 as an example. The optic axis of the first birefringent layer 111 in the bottom layer/portion, the optic axis of the first birefringent layer 111 in the middle layer/portion, and the optic axis of the first birefringent layer 111 in the top layer/portion may be oriented in a same direction, e.g., a same in-plane direction. That is, the orientations of the optic axes of the first birefringent layer 111 in the bottom layer/portion, the middle layer/portion, and the top layer/portion may be substantially the same. In other words, the optic axis of the first birefringent layer 111 may have a first spatially constant orientation within the first birefringent layer 111, e.g., along a first direction forming a first angle with respect to the y-axis direction, as shown in FIG. 1. The first angle may correspond to a first azimuthal angle of the optically anisotropic molecules included in the first birefringent layer 111. The optic axis of the second birefringent layer 112 may have a second spatially constant orientation within the second birefringent layer 112, e.g., along a second direction forming a second angle with respect to the y-axis direction. The second angle may correspond to the second azimuthal angle of the optically anisotropic molecules in the second birefringent layer 112. The optic axis of the third birefringent layer 113 may have a third spatially constant orientation within the third birefringent layer 113, e.g., along a third direction forming a third angle with respect to the y-axis direction. The third angle may correspond to the third azimuthal angle of the optically anisotropic molecules in the third birefringent layer 113. The first, second, third directions may be different. In other words, the first angle (or the corresponding first azimuthal angle), the second angle (or the corresponding second azimuthal angle), and the third angle (or the corresponding third azimuthal angle) may be different. In some embodiments, each of the optic axes of the birefringent layers 111, 112, and 113 may be oriented in a plane (e.g., the x-y plane) substantially parallel to the substrate 105 or perpendicular to the thickness direction of the birefringent layers (e.g., the z-axis direction).

In some embodiments, the spatially constant orientation of the optic axis of each of the birefringent layers 111, 112, and 113 may be achieved through configuring the optically anisotropic molecules included in the birefringent layer to have a substantially same azimuthal angle. The azimuthal angles of the optically anisotropic molecules included in the respective birefringent layers 111, 112, and 113 may be configured to have different values, such that the optical device 100 may provide a substantially constant retardance for lights in a design wavelength range. An azimuthal angle of the optically anisotropic molecule may refer to an angle between a projection of the longitudinal axis onto a plane (e.g., an x-y plane) parallel to the substrate 105 (or perpendicular to the thickness direction of the layer) and a predetermined reference direction (e.g., the y-axis direction or the x-axis direction) within the plane. For discussion purposes, the predetermined reference direction within the plane is the y-axis direction in FIG. 1.

In addition, the optically anisotropic molecules included in each of the birefringent layers 111, 112, and 113 may have a substantially same tilt angle. The tilt angle may be defined as an angle between the longitudinal axis and an axis of the layer in the thickness direction (e.g., the z-axis). In some embodiments, the tilt angle may be relatively small, e.g., in a range of 0° to 10° or a range of 0° to −10°. In some embodiments, the optically anisotropic molecules of the three birefringent layers 111, 112, and 113 may have a substantially same tilt angle. That is, the optically anisotropic molecules included in each of the birefringent layers 111, 112, and 113 may have a substantially same orientation (e.g., substantially same azimuthal angle and same tilt angle). In some embodiments, the optically anisotropic molecules of the three birefringent layers 111, 112, and 113 may have different tilt angles. For example, the optically anisotropic molecules included in the first birefringent layer 111 may have a first tilt angle, the optically anisotropic molecules included in the second birefringent layer 112 may have a second tilt angle, and the optically anisotropic molecules included in the third birefringent layer 113 may have a third tilt angle. In some embodiments, at least two of the first tilt angle, the second tilt angle, and the third tilt angle may be different. In some embodiments, all of the first tilt angle, the second tilt angle, and the third tilt angle may be different from one another.

In some embodiments, all of the birefringent layers 111, 112, and 113 may include the same birefringent material. In some embodiments, at least one of the birefringent layers 111, 112, and 113 may include a birefringent material that is different from the materials of the other layers. In some embodiments, at least one of the birefringent layers 111, 112, and 113 may be a thin film including two or more birefringent materials. The birefringent layer may be a coating (or a layer, a film, etc.) formed by, for example, spin coating a film of polymerizable birefringent material precursors on a substrate and polymerizing the birefringent material precursors. Examples of polymerizable birefringent material precursors may include mixed liquid crystal ("LC") materials and polymerizable monomers, reactive mesogens, etc. In some embodiments, the LC materials may include nematic LCs, twist-bend LCs, or chiral nematic LCs (or LCs with chiral dopant), etc. The chiral nematic LCs (or LCs with chiral dopant) may enable a dual-twist or multiple-twist structure of the birefringent layer. The LC materials may have positive or negative dielectric anisotropy. For the purpose of discussion, a liquid crystal polymer ("LCP") layer is used as an example of a birefringent layer. Hence, the first birefringent layer 111, the second birefringent layer 112, and the third birefringent layer 113 may be referred to as the first LCP layer 111, the second LCP layer 112, and the third LCP layer 113.

The optical device 100 may include a substrate 105. The substrate 105 may be any suitable substrate. In some embodiments, the substrate 105 may be silicon, silicon dioxide, sapphire, plastic, polymer or some other semiconductor that is substantially transparent in a visible ("VIS") band (e.g., about 400 nanometer (nm) to 700 nm or a portion thereof). In some embodiments, the substrate 105 may also be transparent in an infrared ("IR") band (e.g., about 700 nm to 1 mm, or a portion thereof). In some embodiments, the substrate 105 may be a flexible substrate, such as polyethylene terephthalate ("PET"), polyethylene naphthalate ("PEN") or any suitable flexible substrates. In some embodiments, the substrate 105 may be an optical element, for example, a convex lens, a concave lens, a plano-convex, a plano-concave lens, etc. In some embodiments, the substrate 105 may be a part of an optical element or an optical device, for example, an electronic display. In some embodiments, the optical device 100 may not include the substrate 105 because the substrate 105 may be removed after the LCP coatings are formed on the substrate 105.

In some embodiments, the optical device 100 may include two or more LCP layers. In the embodiment shown in FIG. 1, the optical device 100 includes the first LCP layer 111, the second LCP layer 112, and the third LCP layer 113 stacked together, which have a thickness of d1, d2, and d3, respectively. Each LCP layer may be configured with an optic axis that has a spatially constant orientation within the LCP layer. That is, the orientation of the optic axis of the LCP layer may be substantially spatially constant within the LCP layer. In other words the optic axis of the LCP layer may not change the orientation or direction (e.g., may not rotate) across the thickness of the LCP layer. The rotation of the optic axis may be substantially zero across the thickness of the LCP layer. For example, when the first LCP layer 111, the second LCP layer 112, and the third LCP layer 113 include LC materials or LC molecules 130, 140, and 150, respectively, the azimuthal angles of the LC molecules 130, 140, and 150 may be $\Phi 1$, $\Phi 2$, and $\Phi 3$ (e.g., with respect to the y-axis direction), respectively. Accordingly, the orientations of the optic axes of the first LCP layer 111, the second LCP layer 112, and the third LCP layer 113 may be presented by $\Phi 1$, $\Phi 2$, and Φ3, respectively. The polymer network is not shown in the figures. The azimuthal angles Φ1, Φ2, and Φ3 may be different from one another. In some embodiments, when more than three LCP layers are included, at least three of azimuthal angles of at least three LCP layers may be different from one another.

In some embodiments, the optical device 100 may further include a plurality of alignment structures, such as photo-alignment material ("PAM") layers configured to have an internal structure aligned according to a polarized light irradiation. In some embodiments, each LCP layer may be provided on a PAM layer. The PAM layer may at least partially align the LC molecules in each LCP layer in a predetermined azimuthal angle. For example, the LC molecules in contact with the PAM layer may be aligned by the PAM layer to have the predetermined azimuthal angle, and the remaining LC molecules in the LCP layer may be aligned according to neighboring LC molecules that have been aligned. In the embodiment shown in FIG. 1, three PAM layers may be provided. For example, a first PAM layer 121 may be provided at a lower side of the first LCP layer 111, a second PAM layer 122 may be provided at a lower side of the second LCP layer 112, and a third PAM layer 123 may be provided at a lower side of the third LCP layer 113. The PAM layer may be made of photosensitive materials capable of being aligned under a polarized light irradiation. For example, after being exposed to a spatially uniform, linearly polarized light with a wavelength in an absorption band of the photosensitive materials, photosensitive material molecules in the PAM layer may be spatially uniformly aligned along a polarization direction of the spatially uniform, linearly polarized light. Due to anisotropic interfacial interaction, the PAM layer that has been uniformly aligned may align the LC molecules in the birefringent layer to have a substantially same alignment within the birefringent layer. That is, the LC molecules in the birefringent layer may be aligned to have a substantially same azimuthal angle within the birefringent layer. Accordingly, the optic axis of the birefringent layer may have a substantially spatially constant orientation within the birefringent layer. For example, the first PAM layer 121 may be configured to align the LC molecules 130 to have an azimuthal angle of (e.g., with respect to the y-axis direction), and the orientation of the optic axis of the first LCP layer 111 may be represented by Φ1. The second PAM layer 122 may be configured to align the LC molecules 140 to have an azimuthal angle of Φ2 (e.g., with respect to the y-axis direction), and the orientation of the optic axis of the second LCP layer 112 may be represented by Φ2. The third PAM layer 123 may be configured to align the LC molecules 150 to have an azimuthal angle of Φ3 (e.g., with respect to the y-axis direction), and the orientation of the optic axis of the third LCP layer 113 may be Φ3.

Within each LCP layer, the orientation of the optic axis of the LCP layer may be substantially spatially constant (e.g., in a substantially same direction) across the LCP layer. Across different LCP layers in the stack, there may be a clocking angle between the neighboring LCP layers. The clocking angle may be defined as the difference between the orientations of the optic axes of two adjacent LCP layers. For example, the clocking angle between the first LCP layer 111 and the second LCP layer 112 may be the difference between Φ1 and Φ2, and the clocking angle between the second LCP layer 112 and the third LCP layer 113 may be the difference between Φ2 and Φ3. Two adjacent LCP layers may be configured to have a non-zero clocking angle, which means the orientations of the optic axes of two adjacent LCP layers may change or be different. In other words, the optic axes may rotate relative to one another around the z-axis (e.g., thickness direction) between two adjacent LCP layers.

In the embodiment shown in FIG. 1, the thicknesses of the LCP layers d1, d2, and d3 may or may not be the same. The thicknesses of the LCP layers may be determined by various factors, such as the birefringence of the LC materials in the LCP layers, a specified optical function, and a specified optical property of the optical device, etc. For example, when the optical device is designed to be an achromatic waveplate over a design (or predetermined) wavelength range, each LCP layer may be configured with a predetermined retardance and an optic axis orientation, such that the optical device may be provided with a predetermined retardance over the design wavelength range. For example, the design wavelength range of an achromatic quarter-wave plate may be from about 400 nm to about 700 nm, which means the achromatic quarter-wave plate may provide a substantially constant quarter-wave retardance for a substantially normally incident light having a wavelength from about 400 nm to about 700 nm.

The retardance provide by an LCP layer can be calculated as $d*\Delta n$, where d is the thickness of the LCP layer, $\Delta n$ is the birefringence of the LC material in the LCP layer. The retardance may be specified in units of degrees, waves, or nanometers. One full wave of retardance is equivalent to 360°, or the number of nanometers at the wavelength of interest. Commonly used retardances include $\lambda/4$ retardance, $\lambda/2$ retardance, and $1\lambda$, retardance, but other values can be used in various applications. In the disclosed embodiments, each LCP layer having a specific retardance may be associated with a parameter referred to as "a number of wavelengths", or "a number of waves," which is expressed as $d*\Delta n/\lambda$, where $\lambda$ is a center wavelength of a design wavelength range. The center wavelength of a design wavelength range may be referred to as a design wavelength in the following description. In some embodiments, the design wavelength may not be the center wavelength. For example, the design wavelength may be a wavelength within a predetermined range of the center wavelength, such as ±20%, ±15%, ±10%, ±5%, ±3%, ±2%, ±1%, etc.

For example, the number of waves of an LCP layer having a half-wave retardance for a design wavelength (e.g., when the design wavelength range is about 400 nm to about 700 nm, the center wavelength of the design wavelength range may be 550 nm) is about 0.5, and the number of waves of an LCP layer having a quarter-wave retardance for a design wavelength (e.g., 550 nm) is about 0.25. In conventional technologies, in some cases, the thickness d of the film may be determined based on the design wavelength $\lambda$, the number of waves, and the birefringence $\Delta n$ of the LC material. For example, when green light is used as a reference light, the design wavelength $\lambda$ may be selected as 550 nm for determining the thickness d of an LCP layer.

In some embodiments, an optimization algorithm may be used to compute design parameters of the optical device 100 including a plurality of LCP layers, such as three LC films in FIG. 1. In one embodiment, the optical device 100 may be designed to be an achromatic quarter-wave plate. The design parameters may be: Φ1=59.77°, Φ2=0°, Φ3=75.65°, the number of waves for the LCP layer 111 may be 0.27 at $\lambda$=550 nm, the number of waves for the LCP layer 112 may be 0.54 at $\lambda$=550 nm, the number of waves for the LCP layer 113 may be 0.45 at $\lambda$=550 nm. As shown in the design parameters, at least one of the numbers of waves for the LCP layers does not correspond to a quarter wave (0.25) or a half wave (0.5) for the design wavelength (e.g., 550 nm). In other words, at least one of the LCP layers is configured to provide a retardance other than a quarter-wave retardance or a half-wave retardance. In the above example, all of the three numbers of waves do not correspond to a quarter wave (0.25) or a half wave (0.5) for the design wavelength (e.g., 550 nm). In other words, all of the LCP layers are configured to provide a respective retardance other than a quarter-wave retardance or a half-wave retardance. As a comparison, an existing achromatic quarter-wave plate made by laminating technologies often includes a half-wave plate that provides a retardance of half wave (the number of waves is 0.5 for a design wavelength (e.g., 550 nm)) and a quarter-wave plate that provides a retardance of quarter wave (the number of waves is 0.25 for a design wavelength (e.g., 550 nm)) laminated together. Although the above example shows that all of the three numbers of waves do not correspond to a quarter wave (0.25) or a half wave (0.5) for a design wavelength, in some embodiments, it is possible that one, or more than one layer in the optical device 100 may correspond to either a quarter-wave plate or a half-wave plate for a design wavelength. For example, one, more than one, or all of the numbers of waves may correspond to either a quarter wave (0.25) or a half wave (0.5) for a substantially normally incident light at a design wavelength.

In some embodiments, the optical device 100 may be fabricated in the following processes: the first PAM layer 121 may be disposed (e.g., coated, formed, deposited, attached, etc.) at a surface (e.g., an upper surface) of the substrate 105. Then a thin film of polymerizable liquid crystal precursors including the LC material 130 may be disposed (e.g., coated, formed, deposited, attached, etc.) at an upper surface of the PAM layer 121, and polymerized to form the first LCP layer 111. The second PAM layer 122 may be disposed (e.g., coated, formed, deposited, attached, etc.) at an upper surface of the first LCP layer 111. A thin film of polymerizable liquid crystal precursors including the LC material 140 may be disposed (e.g., coated, formed, deposited, attached, etc.) at an upper surface of the second PAM layer 122, and polymerized to form the second LCP layer 112. The third PAM layer 123 may be disposed (e.g., coated, formed, deposited, attached, etc.) at an upper surface of the second LCP layer 112. A thin film of polymerizable liquid crystal precursors including the LC material 150 may be disposed (e.g., coated, formed, deposited, attached, etc.) at an upper surface of the second PAM layer 123 and polymerized to form the third LCP layer 113. In some embodiments, after the third LCP layer 113 is formed, the substrate 105 may be removed. In some embodiments, the substrate 105 may be retained, i.e., included in the optical device 100. In some embodiments, at least one of the three PAM layers (e.g., PAM layer 121) may be removed.

FIG. 2 is a schematic diagram of an optical device 200. The optical device 200 may include at least two LCP layers, and at least one of the LCP layers may have an in-plane twist structure that is associated with a non-zero twist angle. In some embodiments, a ratio between the twist angle of each LCP layer and a thickness of each LCP layer (e.g., a twist angle per unit thickness) may be different from layer to layer (e.g., across the plurality of LCP layers). Further, the orientations of the optic axes of the LCP layers may change continuously, from film to film. For example, within an LCP layer, the orientation of the optic axis of the layer may not be spatially constant. That is, the orientation of the optic axis of the LCP layer may spatially vary across the thickness of the layer. Between two adjacent layers, the orientation of the optic axis of the first LCP layer at an interface between the first LCP layer and the second LCP layer may be substantially the same as the orientation of the optic axis of the second LCP layer at the interface. In other words, between two adjacent layers, the orientations of the optic axes of the LCP layers may be continuous. Thus, clocking angles may not be configured between two adjacent LCP layers (or may be substantially zero). In some embodiments, the optical device 200 may not include an additional alignment film disposed between two adjacent LCP layers.

As shown in FIG. 2, the optical device 200 may include a substrate 205, a first LCP layer 211, and a second LCP layer 212. The first LCP layer 211 may have a first thickness d1, and the second LCP layer 212 may have a second thickness d2. Although LCPs are used for both layers, in some embodiments, different birefringent materials may be used in different layers. In some embodiments, the tilt angles of the optically anisotropic molecules of the two LCP layers 211 and 212 may be relatively small, e.g., in a range of 0° to 10° or a range of 0° to −10°. In some embodiments, the optically anisotropic molecules of the two LCP layers 211 and 212 may have a substantially same tilt angle (e.g., 0°. In some embodiments, the optically anisotropic molecules of the two LCP layers 211 and 212 may have different tilt angles (e.g., 0° and 2°).

At least one of the LCP layers may have an in-plane twist structure that is associated with a non-zero twist angle, where the LC molecules may rotate along an axis (e.g., along a z-axis direction) of the twist structure, and the LC director of the LC molecules may be substantially perpendicular to the axis of the twist structure. That is, rather than having a spatially constant optic axis as shown in FIG. 1, the optic axis of the LCP layer shown in FIG. 2 may rotate around the z-axis in the thickness direction. In other words, the orientation of the optic axis of the LCP layer may be spatially varying (e.g., may change continuously) by a predetermined degree from the bottom portion to the top portion of the LCP layer in the thickness direction (e.g., the z-axis direction shown in FIG. 2). The change in the orientation of the optic axis between at the top portion and at the bottom portion of an LCP layer may be referred to as the twist angle. The spatially varying optic axis may be introduced by the in-plane twist of the LCs. Rather than being aligned in the same direction within a layer, the LC molecules may be oriented in different directions having different azimuthal angles, resulting in a twist structure having a non-zero twist angle within a layer. The in-plane twist of the LCs across the thickness direction within the LCP layer may be realized by adding chiral dopants into the polymerizable LC material precursors. Further, when the optical device includes two or more LCP layers each having an in-plane twist structure, the two or more LCP layers may have two or more different twist angles per unit thickness, which may be realized by adding different concentrations of chiral dopants and/or adding chiral dopants with different helical twisting powers ("HTP") into the polymerizable LC material precursors. Although two LCP layers are shown for illustrative purposes, the optical device 200 may include any other suitable number of layers, such as three, four, five, etc. In some embodiments, when more than two LCP layers are included, each may include a twist structure, and the twist angles of the more than two LCP layers may be different from one another. In some embodiments, at least two twist angles of the more than two twist angles may be different from one another.

For illustrative purposes, FIG. 2 shows that the optical device 200 includes two LCP layers each having an in-plane twist structure. In the optical device 200 including at least one LCP layer having an in-plane twist structure, the orientations of the optic axes of the neighboring LCP layers at the interface between the neighboring LCP layers may be continuous (e.g., may have substantially the same orientations at the interface). For example, the orientation of the optic axis of the first LCP layers 211 at the top portion of the first LCP layer 211 may be substantially the same as the orientation of the optic axis of the second LCP layer 212 at the lower portion of the second LCP layer 212.

For example, as shown in FIG. 2, each of the LCP layers 211 and 212 may be presumed to include three sub-layers/portions (e.g., a bottom layer/portion, a middle layer/portion, and a top layer/portion) of optically anisotropic molecules (e.g., LC molecules). Take the first LCP layer 211 as an example. The optic axis of the first LCP layer 211 at the bottom layer/portion, the optic axis of the first LCP layer 211 at the middle layer/portion, and the optic axis of the first LCP layer 211 at the top layer/portion may be oriented in different in-plane (in the x-y plane) directions, thereby realizing an in-plane twist of the first LCP layer 211. In other words, the azimuthal angels of the optically anisotropic modules 230 of the first LCP layer 211 at the bottom layer/portion, the azimuthal angels of the optically anisotropic modules 230 of the first LCP layer 211 at the middle layer/portion, and the azimuthal angels of the optically anisotropic modules 230 of the first LCP layer 211 at the top layer/portion may be different.

In some embodiments, the overall continuous orientation of the optic axes of the multiple LCP layers may be achieved through configuring optically anisotropic molecules adjacent an interface between two adjacent LCP layers to have substantially the same azimuthal angle. For example, the first LCP layer 211 and the second LCP layer 212 may have an interface 251. The optically anisotropic molecules 230 at a first portion (e.g., the top portion) of the first LCP layer 211 adjacent the interface 251, and the optically anisotropic molecules 240 at a second portion (e.g., a bottom portion) of the second LCP layer 212 adjacent the interface 251, may be configured to have substantially the same azimuthal angle. Thus, there is a continuity between the azimuthal angles between the two LCP layers 211 and 212 at the interface 251.

As shown in FIG. 2, the first LCP layer 211 may include LCs 230, and the second LCP layer 212 may include LCs 240. Dashed lines 251 and 252 are only used to represent the interface between the films or layers that may be formed separately, or between a film and ambient air. Each of the at least two LCP layers included in the optical device 200 may have an in-plane twist structure associated with a non-zero twist angle. For example, the first LCP layer 211 may be associated with a first twist angle ($\delta t1$), and the second LCP layer 212 may be associated with a second twist angle ($\delta t2$). The first twist angle OM may be the difference between the azimuthal angles between LC molecules at the top portion and at the bottom portion of the first LCP layer 211. The second twist angle ($\delta t2$) may be the difference between the azimuthal angles between LC molecules at the top portion and at the bottom portion of the second LCP layer 212. For each film, a ratio (e.g., twist angle per unit thickness) may be calculated by dividing the twist angle by the thickness. In some embodiments, the ratio may be different for different films. For example, ($\delta t1$)/d1 for the LCP layer 211 may be different from ($\delta t2$)/d2 for the LCP layer 212. In some embodiments, the ratio may be the same for different films or layers.

The twist angle represents a total amount of change in the orientations of the optic axis across the thickness of an LCP layer. In some embodiments, the orientations of the optic axes in neighboring LCP layers having an in-plane twist structure may be continuous at the interface of the neighboring LCP layers. In other words, the orientations of the optic axes at the interface may be substantially the same. That is, the azimuthal angle of the LC molecules in the second LCP layer 212 at the bottom portion of the second LCP layer 212 adjacent the interface 251 may substantially equal to the sum of the azimuthal angle of the LC molecules in the first LCP layer 211 at the bottom portion of the first LCP layer 211 and the first twist angle $\delta t1$.

In some embodiments, the optical device 200 may include a PAM layer 220, which may align the LC molecules in the first LCP layer 211 to have an azimuthal angle $\Phi 1$ at a bottom portion near or at a top surface of the PAM layer 220. That is, the first LCP layer 211 may have an initial optic axis orientation (represented by $\Phi 1$) at the bottom portion near or at a top surface of the PAM layer 220. The first twist angle $\delta t1$ represents a total change in angle (or the total change in the orientation of the optic axis) from the initial optic axis orientation ($\Phi 1$) at a top surface of the PAM layer 220 to the interface 251 between the first LCP layer 211 and the second LCP layer 212. In other words, at the interface 251 (i.e., top portion of the first LCP layer 211), the azimuthal angle of the LC molecules 230 may be ($\Phi 1+\delta t1$). Accordingly, the orientation of the optic axis of the first LCP layer 211 at the interface 251 (i.e., top portion of the first LCP layer 211) may be represented by ($\Phi 1+\delta t1$). In some embodiments, across the thickness dl within the first LCP layer 211, the orientation of the optic axis may vary continuously (e.g., linearly or non-linearly) from an angle $\Phi 1$ to an angle $\Phi 1+\delta t1$ (presuming that the pretilt angle is 0).

The second twist angle $\delta t2$ represents a total change in angle (or a total change in the orientation of the optic axis) from the initial optic axis orientation ($\Phi 2=\Phi 1+\delta t1$) at the interface 251 (e.g., at a bottom portion of the second LCP layer 212) to the interface 252 (e.g., a top portion of the second LCP layer 212). In other words, at the interface 251, the azimuthal angles of the LC molecules 240 in the second LCP layer 212 may be ($\Phi 1+\delta t1$) or substantially close to ($\Phi 1+\delta t1$). In other words, at the interface 251, the LC molecules 240 in the second LCP layer 212 may have substantially the same azimuthal angle as the LC molecules 230 in the first LCP layer 211. The orientation of the optic axis of the second LCP layer 212 at the interface 252 may be ($\Phi 1+\delta t1+\delta t2$) or substantially close to ($\Phi 1+\delta t1+\delta t2$). Within the second LCP layer 212, the orientation of the optic axis may vary continuously (e.g., linearly or non-linearly) from the bottom portion of the second LCP layer 212 to the top portion of the LCP layer 212. For example, the orientation of the optic axis across the thickness d2 of the second LCP layer 212 may continuously change from ($\Phi 1+\delta t1$) to ($\Phi 1+\delta t1+\delta t2$). The continuity in the orientations of the optic axes of the first LCP layer 211 and the second LCP layer 212 at the interface 251 may be maintained to be substantially the same by specially configuring the chiral dopant or the concentration of the chiral dopant, such that the azimuthal angles of the LC molecules 240 of the second LCP layer 212 near or at the interface 251 may be substantially the same as the azimuthal angles of the LC molecules 230 of the first LCP layer 211 near or at the interface 251. Accordingly, the orientations of the optic axes of the LCP layers may vary continuously across the thickness of the optical device 200, from $\Phi 1$ to ($\Phi 1+\delta t1+\delta t2$).

In some embodiments, the optical device 200 having two twisted LCP layers as shown in FIG. 2 may be configured to be an achromatic quarter-wave plate. The design parameters of the optical device having two twisted LCP layers shown in FIG. 2 may include: ($\Phi1=14.3°$, the number of waves for the first LCP layer 211 may be 0.33 at $\lambda=550$ nm, the first twist angle $\delta t1=0°$, ($\Phi2=14.3°$, the number of waves for the second LCP layer 212 may be 0.32 at $\lambda=550$ nm, the second twist angle $\delta t2=83.5°$. As shown in the example design parameters, at least one of the two layers does not correspond to a quarter-wave plate or a half-wave plate of a design wavelength $\lambda$ (e.g., 550 nm). For example, the number of waves for the first LCP layer 211 is 0.33 at $\lambda=550$ nm, and the number of waves for the second LCP layer 212 is 0.32 at $\lambda=550$ nm, both of which do not correspond to a quarter wave (the number of waves is 0.25) or a half wave (the number of waves is 0.50) for the design wavelength $\lambda$ (e.g., 550 nm). In other words, at least one (e.g., both) of the two LCP layers does not correspond to a quarter-wave plate or a half-wave plate of the design wavelength $\lambda$ (e.g., 550 nm), or at least one (e.g., both) of the two LCP layers provides a retardance other than a quarter-wave retardance or a half-wave retardance. It is to be noted that although this example shows that both layers do not correspond to a quarter-wave plate or a half-wave plate, in some embodiments, one or more than one layer may correspond to either a quarter-wave plate or a half-wave plate. In other words, in some embodiments, one or more than one number of waves of the layers may correspond to a quarter wave (the number of waves is 0.25) or a half wave (the number of waves is 0.5) for a substantially normally incident light of a design wavelength.

The second optical device 200 may be fabricated in the following processes: first, the PAM layer 220 may be disposed (e.g., coated, formed, deposited, attached, etc.) at a top surface of the substrate 205. A thin film of polymerizable liquid crystal precursors including the LCs 230 and a chiral dopant that introduces the first twist angle $\delta t1$ (if a twist angle is 0°, no dopant may be added) may be disposed (e.g., coated, formed, deposited, attached, etc.) at a top surface of the PAM layer 220. The polymerizable liquid crystal precursors coating including the mixed LCs 230 and the chiral dopant may be polymerized to form the first LCP layer 211. Then, a thin film of polymerizable liquid crystal precursors including the LCs 240 and a chiral dopant that introduces the second twist angle $\delta t2$ (if a twist angle is 0°, no dopant may be added) may be disposed (e.g., coated, formed, deposited, attached, etc.) at a top surface of the first LCP layer 211. The polymerizable liquid crystal precursors coating including the mixed LCs 230 and the chiral dopant may be polymerized to form the second LCP layer 212. After the second LCP layer 212 is formed, the substrate 205 may be removed. In some embodiments, the substrate 205 may be included in the optical device 200. In some embodiments, the PAM 220 may be removed. As shown in FIG. 2, an addition alignment film (e.g., an additional PAM layer) may not be provided between the first LCP layer 211 and the second LCP layer 212, and a clocking angle may not be configured (e.g., the clocking angle may be zero) between the first LCP layer 211 and the second LCP layer 212.

Figure 3:
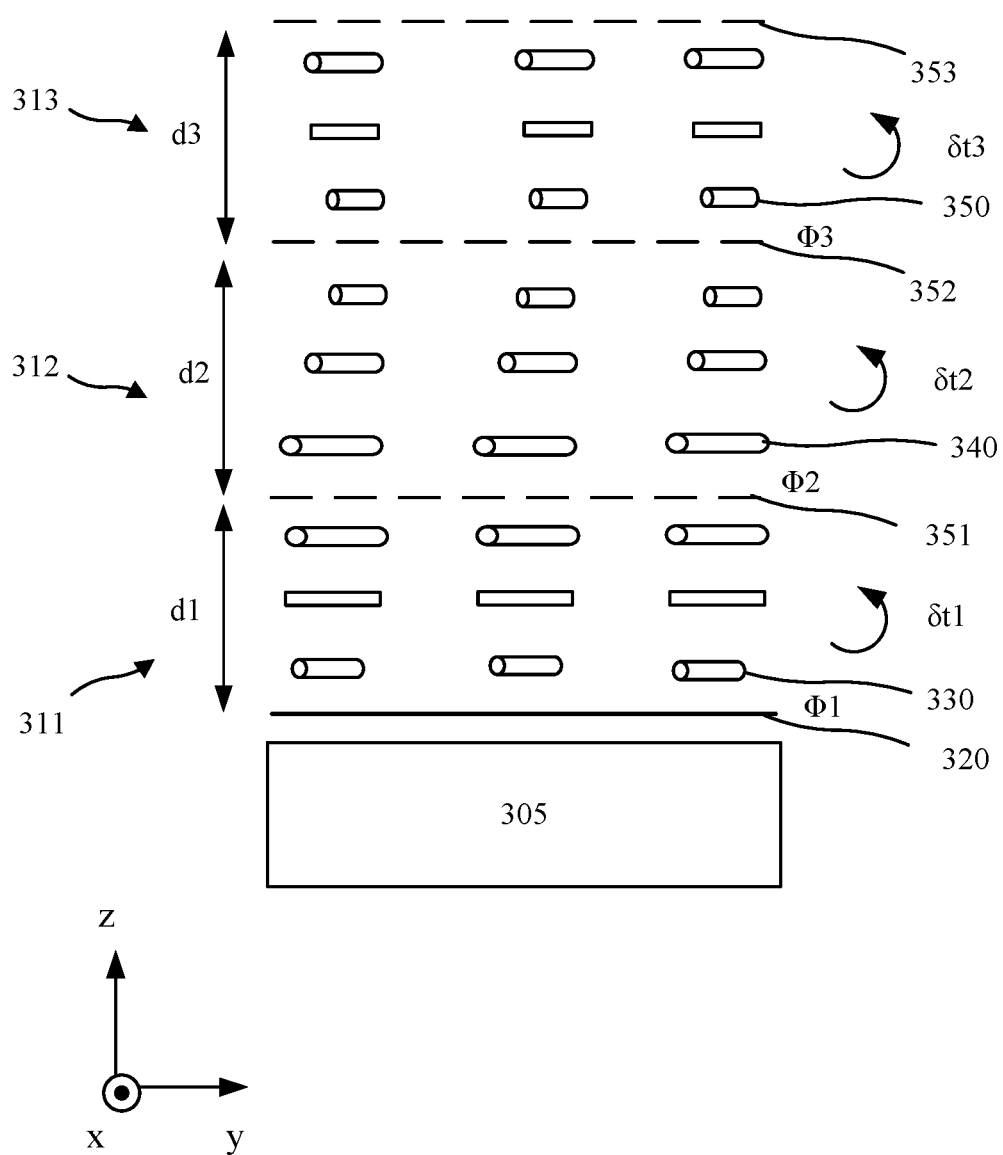
FIG. 3 illustrates a schematic diagram of an optical device, according to another embodiment of the disclosure.

FIG. 3 is a schematic diagram of an optical device 300. The optical device 300 may have a structure that is similar to the optical device 200, except that the optical device 300 may include at least one third LCP layer. Detailed descriptions of the same or similar elements included in the optical device 300 may refer to the above description rendered in connection with the optical device 200. Although three layers are shown for illustrative purposes, in some embodiments, more than three films (e.g., four, five, six, etc.) may be included. Similar to the configuration of the optical device 200, at least one of the LCP layers may have an in-plane twist structure associated with a non-zero twist angle. Also similar to the optical device 200, the orientations of the optic axes of the LCP layers may spatially vary continuously from one film (or layer) to another. At any interface between two adjacent LCP layers, the orientation of the optic axis of a lower layer at a top portion adjacent the interface may be substantially the same as the orientation of the optic axis of an upper layer at a bottom portion adjacent the interface. In other words, presuming that the pretilt angle is substantially the same, the azimuthal angles of the LC molecules at or near the interface between two layers may be substantially the same. Accordingly, a continuity in the orientations of the optic axes in multiple LCP layers may be maintained.

As shown in FIG. 3, the optical device 300 may include a substrate 305, a first LCP layer 311, a second LCP layer 312, and a third LCP layer 313. A PAM layer 320 may be provided at a top surface of the substrate 305. The first LCP layer 311 having LC molecules 330 may be disposed (e.g., coated, formed, deposited, attached, etc.) at a top surface of the PAM layer 320. The second LCP layer 312 may be disposed (e.g., coated, formed, deposited, attached, etc.) at a top surface of the first LCP layer 311, and the third LCP layer 313 may be disposed (e.g., coated, formed, deposited, attached, etc.) at a top surface of the second LCP layer 312. Each layer may have a thickness d1, d2, and d3, respectively. Each film or layer may have a twist angle $\delta t1$, $\delta t2$, and $\delta t3$, respectively.

The PAM layer 320 may align LC molecules 330 near or at the top surface of the PAM layer 320 in an azimuthal angel $\Phi1$. The orientation of the optic axis of the first LCP layer 311 near or at the top surface of the PAM layer 320 may correspond to $\Phi1$. Within the first LCP layer 311, across the thickness direction (e.g., the z-axis direction shown in FIG. 3), the orientation of the optic axis may spatially vary continuously (e.g., linearly continuously or non-linearly continuously). That is, the orientation of the optic axes of the three LCP layers 311, 312, and 313 spatially vary continuously (e.g., linearly continuously or non-linearly continuously) across the stack in the thickness direction (e.g., the z-axis direction shown in FIG. 3). For example, at a first interface 351 between the first LCP layer 311 and the second LCP layer 312, the orientation of the optic axis of the first LCP layer 311 may be represented by $\Phi2$, where $\Phi2=\Phi1+\delta t1$. The orientation of the optic axis of the second LCP layer 312 at the first interface 351 may be substantially the same as the orientation of the optic axis of the first LCP layer 311, i.e., $\Phi2=\Phi1+\delta t1$. Thus, the continuity in the orientations of the optic axes from the first LCP layer 311 to the second LCP layer 312 is maintained at the first interface 351. At a second interface 352 between the second LCP layer 312 and third LCP layer 313, the orientation of the optic axis of the second LCP layer 312 may be represented by $\Phi3$, where $\Phi3=\Phi2+\delta t2$. The orientation of the optic axis of the third LCP layer 313 at the second interface 352 may be substantially the same as the orientation of the optic axis of the second LCP layer 312, i.e., $\Phi3=\Phi2+\delta t2$. Thus, the continuity in the orientations of the optic axes from the second LCP layer 312 to the third LCP layer 313 is maintained at the second interface 352. At the third interface 353, the orientation of the optic axis of the third LCP layer 313 may be $\Phi3+\delta t3$. Thus, across the thickness, the orientations of the optic axes of the LCP layers 311, 312, and 313 may spatially vary continuously (e.g., linearly or non-linearly). The continuity in the orientation of the optic axis between adjacent layers is maintained.

In some embodiments, a ratio between the twist angle and the thickness of each LCP layer, i.e., a twist angle per unit thickness, may be calculated for the optical device 300. The ratio may be different for different LCP layers (e.g., at least two ratios may be different from one another or all three ratios may be different). For example, δt1/d1 may be different from δt2/d2. In some embodiments, δt1/d1 may be different from δt3/d3. In some embodiments, δt2/d2 may be different from δt3/d3. In some embodiments, at least one of the three ratios may be different from the other two ratios that may be the same. In some embodiments, at least two ratios may be the same. In some embodiments, all three ratios may be the same. The fabrication process for the optical device 300 may be similar to that of the optical device 200, which is described above in connection with the optical device 200.

In some embodiments, the optical device 300 may be configured to be an achromatic quarter-wave plate over a design wavelength range. The design parameters for the optical device 300 may include: Φ1=0°, the number of waves for the first LCP layer 311 may be 0.52 at λ=550 nm, the twist angle δt1 for the first LCP layer 311 may be 11.4°, Φ2=11.4°, the number of waves for the second LCP layer 312 may be 0.50 at λ=550 nm, the twist angle δt2 for the second LCP layer 312 may be 42.3°, Φ3=53.7°, the number of waves for the third LCP layer 313 may be 0.23 at λ=550 nm, and the twist angle δt3 for the third LCP layer 313 may be 83°.

As shown in this example design, at least one of the three numbers of waves for the three LCP layers does not correspond to a quarter wave (the number of waves is 0.25) or a half wave (the number of waves is 0.5) of a design wavelength λ (e.g., 550 nm). In other words, at least one of the three LCP layers does not correspond to a quarter-wave plate or a half-wave plate, or at least one of the three LCP layers provides a retardance other than the quarter-wave retardance or the half-wave retardance. In this example, the number of waves for the second LCP layer 312 is 0.50 at λ=550 nm, which corresponds to a half wave of the design wavelength λ (e.g., 550 nm), but the other two numbers of waves for the first LCP layer 311 (0.52) and the third LCP layer 313 (0.23) do not correspond to a quarter wave or a half wave of the design wavelength λ (e.g., 550 nm). In other words, except for the number of the waves of the second LCP layer 312, which may correspond to a half-wave plate of the design wavelength λ (e.g., 550 nm), the number of the waves of the first LCP layer 311 and the third LCP layer 313 do not correspond to a quarter-wave plate or a half-wave plate of the design wavelength λ (e.g., 550 nm). In other words, the first LCP layer 311 and the third LCP layer 313 are configured to each provide a retardance other than a quarter-wave retardance or a half-wave retardance.

Figure 4:
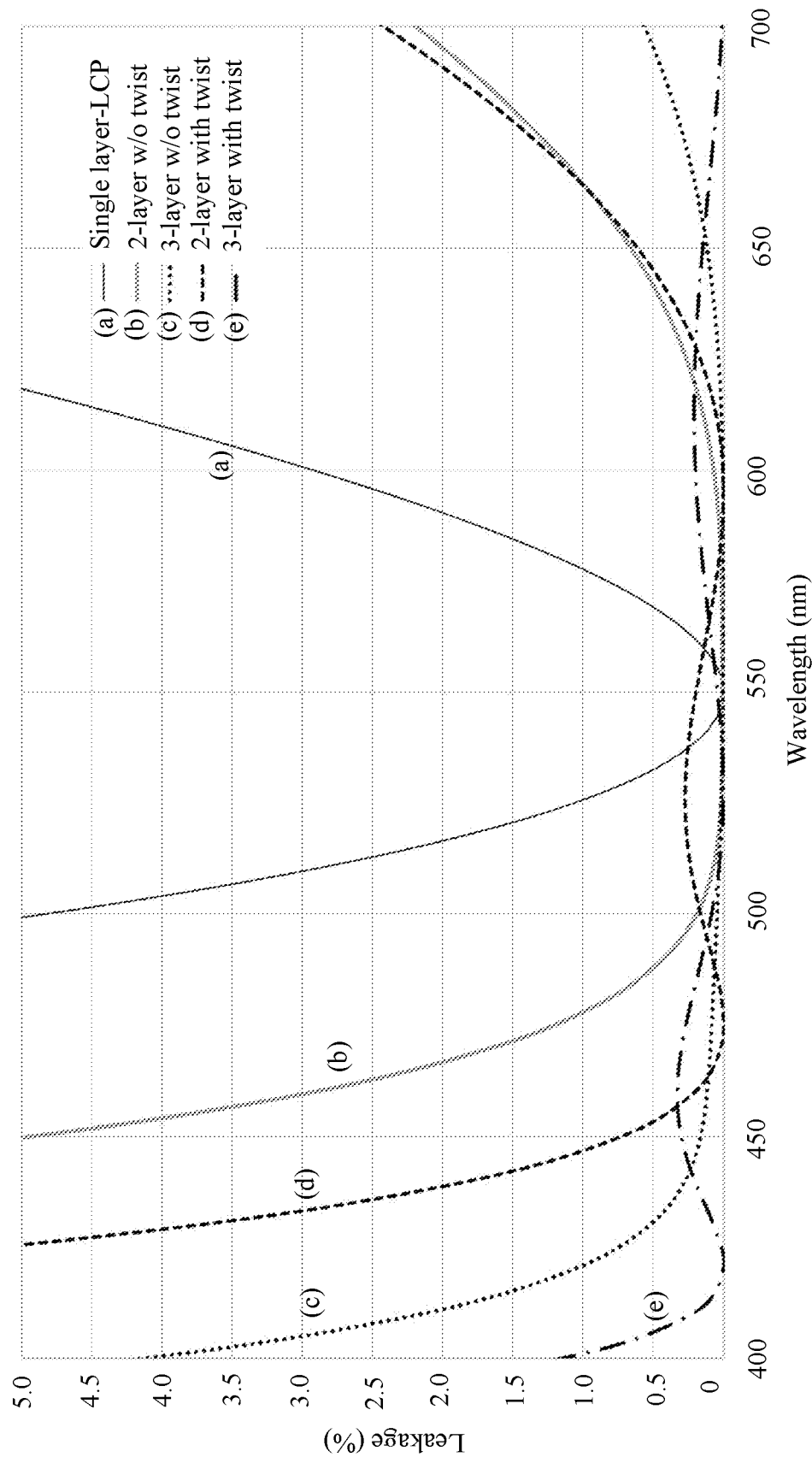
FIG. 4 shows simulation results of wavelength dependent light leakage of conventional configurations and the disclosed configurations.

FIG. 4 shows simulation results comparing the conventional achromatic quarter-wave plate and the disclosed achromatic quarter-wave plate formed by LCP coatings or layers. FIG. 4 plots light leakage (measured as a percentage) versus the wavelength of a normally incident light. To calculate the light leakage, a linear polarizer, a quarter-wave plate, and a circular polarizer are arranged in optical series. The linear polarizer may be configured to receive an unpolarized incident light. The unpolarized light may become a linear polarized light after being transmitted through the linear polarizer. The linearly polarized light may have a polarization axis parallel to a polarization axis or transmission axis of the linear polarizer. A polarization axis of the quarter-wave plate may be oriented relative to a polarization axis of the linear polarizer to convert the linearly polarized light to a circularly polarized light having a left or right handedness propagating toward the circular polarizer. To measure the light leakage, when the circularly polarized light output by the quarter-wave plate has the left handedness, the circular polarizer may be configured to transmit a circularly polarized light having a right handedness, and block a circularly polarized light having a left handedness. When the circularly polarized light output by the quarter-wave plate has the right handedness, the circular polarizer may be configured to transmit a circularly polarized light having a left handedness, and block a circularly polarized light having a right handedness. The light leakage may be calculated as a ratio of the intensity of the light transmitted through the circular polarizer over the intensity of the light incident onto the linear polarizer.

The light leakage of the quarter-wave plate is calculated for a design wavelength range covering from 400 nm to 700 nm. A design wavelength, which may be the center wavelength of the design wavelength range, is 550 nm. Smaller light leakage over the design wavelength range indicates a better the broadband performance of the quarter-wave plate. The plot of FIG. 4 evaluates the broadband performance of the various designs (including the conventional designs). Five different designs are compared. The "single layer-LCP" (also labeled "(a)") and the "2-layer w/o twist" (also labeled "(b)") are two conventional configurations: one including a single LCP layer, and the other including two LCP layers without an in-plane twist structure for each LCP layer. The other three configurations are embodiments of the present disclosure: "3-layer w/o twist" (also labeled "(c)") represents an embodiment shown in FIG. 1, "2-layer with twist" (also labeled "(d)") represents an embodiment shown in FIGS. 2, and "3-layer with twist" (also labeled "(e)") represents an embodiment shown in FIG. 3. Except for the single LCP layer configuration, the design parameters for the other four configurations are provided in the following table. It is noted that in the example simulation results shown in FIG. 4, the design wavelength λ is 550 nm, and the design wavelength range is 400 nm to 700 nm.

TABLE

| | Design Parameters | | | | | | | | |
|---|---|---|---|---|---|---|---|---|---|
| LCP layers | Φ1 (°) | Number of waves at center wavelength | δt1 (°) | Φ2 (°) | Number of waves at center wavelength | δt2 (°) | Φ3 (°) | Number of waves at center wavelength | δt3 (°) |
| 2-layer w/o twist | 15 | 0.50 | 0 | 75 | 0.25 | 0 | N/A | N/A | N/A |
| 3-layer w/o twist | 59.77 | 0.27 | 0 | 0 | 0.54 | 0 | 75.65 | 0.45 | 0 |

TABLE-continued

Design Parameters

| LCP layers | Φ1 (°) | Number of waves at center wavelength | δt1 (°) | Φ2 (°) | Number of waves at center wavelength | δt2 (°) | Φ3 (°) | Number of waves at center wavelength | δt3 (°) |
|---|---|---|---|---|---|---|---|---|---|
| 2-layer with twist | 14.3 | 0.33 | 0 | 14.3 | 0.32 | 83.5 | N/A | N/A | N/A |
| 3-layer with twist | 0 | 0.52 | 11.4 | 11.4 | 0.50 | 42.3 | 53.7 | 0.23 | 83 |

As shown in FIG. 4, the light leakage for the quarter-wave plate having a single LCP layer configuration ("labeled "Single layer-LCP"), which is a conventional technology, is small for only a relatively narrow bandwidth. For example, if light leakage of 1.5% is used as a threshold, the quarter-wave plate having the single LCP layer configuration may provide a substantially constant retardance (i.e., may be achromatic) over a wavelength range from about 520 nm to about 580 nm (or a bandwidth of 60 nm). The quarter-wave plate having a "2-layer w/o twist" configuration, which is also a conventional configuration in which each layer corresponds to either a quarter-wave plate (d*Δn/λ=0.25) or a half-wave plate (d*Δn/λ=0.50) at the design wavelength 550 nm, may provide a substantially constant retardance over a wavelength range from about 470 nm to about 680 nm (or a bandwidth of about 210 nm). In comparison, the quarter-wave plate having the "3-layer w/o twist" configuration of the present disclosure, in which none of the three layers corresponds to a quarter-wave plate or a half-wave plate at the design wavelength 550 nm, may provide a substantially constant retardance over a wavelength range from about 420 nm to over 700 nm (or a bandwidth of greater than 280 nm). The quarter-wave plate having the "2-layer with twist" configuration according to an embodiment of the present disclosure, in which neither of the two layers corresponds to a quarter-wave plate or a half-wave plate at the design wavelength 550 nm, may provide a substantially constant retardance over a wavelength range from about 440 nm to 670 nm (or a bandwidth of about 230 nm). The quarter-wave plate having the "3-layer with twist" configuration according to an embodiment of the present disclosure, in which two of the three layers do not correspond to a quarter-wave plate or a half-wave plate at the design wavelength range 550 nm, may provide a substantially constant retardance over a wavelength range from lower than 400 nm to over 700 nm (or a bandwidth of greater than 300 nm). As shown in FIG. 4, the quarter-wave plates having the configuration according to an embodiment of the present disclosure may have an improved broadband performance as compared to the quarter-wave plates having the configuration of conventional technologies.

If the light leakage of 1% is used as a threshold, the quarter-wave plate having the single LCP layer configuration may provide a substantially constant retardance (i.e., may be achromatic) over a wavelength range from about 525 nm to 575 nm (or a bandwidth of about 50 nm). The quarter-wave plate having a "2-layer w/o twist" configuration, in which each layer corresponds to either a quarter-wave plate (d*Δn/λ=0.25) or a half-wave plate (d*Δn/λ=0.50) at the design wavelength 550 nm, may provide a substantially constant retardance over a wavelength range from about 475 nm to about 663 nm (or a bandwidth of about 88 nm). In comparison, the quarter-wave plate having the "3-layer w/o twist" configuration of the present disclosure, in which none of the three layers corresponds to a quarter-wave plate or a half-wave plate at the design wavelength 550 nm, may provide a substantially constant retardance over a wavelength range from 425 nm to over 700 nm (or a bandwidth of greater than 275 nm). The quarter-wave plate having the "2-layer with twist" configuration according to an embodiment of the present disclosure, in which neither of the two layers corresponds to a quarter-wave plate or a half-wave plate, may provide a substantially constant retardance over a wavelength range from about 450 nm to about 663 nm (or a bandwidth of about 213 nm). The quarter-wave plate having the "3-layer with twist" configuration according to an embodiment of the present disclosure, in which two of the three layers do not correspond to a quarter-wave plate or a half-wave plate at the design wavelength 550 nm, may provide a substantially constant retardance over a wavelength range about 400 nm to over 700 nm (or a bandwidth of greater than 300 nm).

As shown in FIG. 4, the quarter-wave plates having the configuration according to an embodiment of the present disclosure may have an improved broadband performance as compared to the quarter-wave plates having the configuration of conventional technologies.

The achromatic quarter-wave plates disclosed in the present disclosure may have a simplified fabrication process and a reduced cost as compared to a conventional achromatic quarter-wave plate fabricated by laminating a half-wave plate and a quarter-wave plate together. In addition to flat substrates, the disclosed optical device fabricated based on LCP coatings (or layers, films, etc.) may also be fabricated on a curved substrate surface, which may overcome the challenges of laminating a flat film on a curved surface, thereby providing more freedom to the optical device design.

The disclosed optical device fabricated based on LCP coatings may have a large variety of applications in a number of fields, which are all within the scope of the present disclosure. Some exemplary applications in augmented reality ("AR"), virtual reality ("VR"), mixed reality ("MR") fields or some combinations thereof will be explained below. Near-eye displays ("NEDs") have been widely used in a large variety of applications, such as aviation, engineering, science, medicine, computer gaming, video, sports, training, and simulations. One application of NEDs is to realize VR, AR, MR or some combination thereof. Desirable characteristics of NEDs include compactness, light weight, high resolution, large field of view ("FOV"), and small form factor. An NED may include a display element configured to generate an image light and a lens system configured to direct the image light toward eyes of a user. The lens system may include a plurality of optical elements, such as lenses, waveplates, reflectors, etc., for focusing the image light to the eyes of the user. To achieve a compact size and light weight and to maintain satisfactory optical characteristics, an NED may adopt a pancake lens assembly in the lens system to fold the optical path, thereby reducing a back focal distance in the NED. A focus of a pancake lens assembly is often strongly chromatic. In other words, lights output from the lens system feature chromatic aberration, which reduces image quality in an imaging device that employs a lens system with the pancake lens and a light source that emits lights of multiple wavelengths or color channels. The disclosed optical films, for example, the disclosed achromatic quarter-wave plate, may be implemented in the pancake lens to reduce the chromatic aberration, thereby improving the image quality of the pancake lens.

Figure 5:
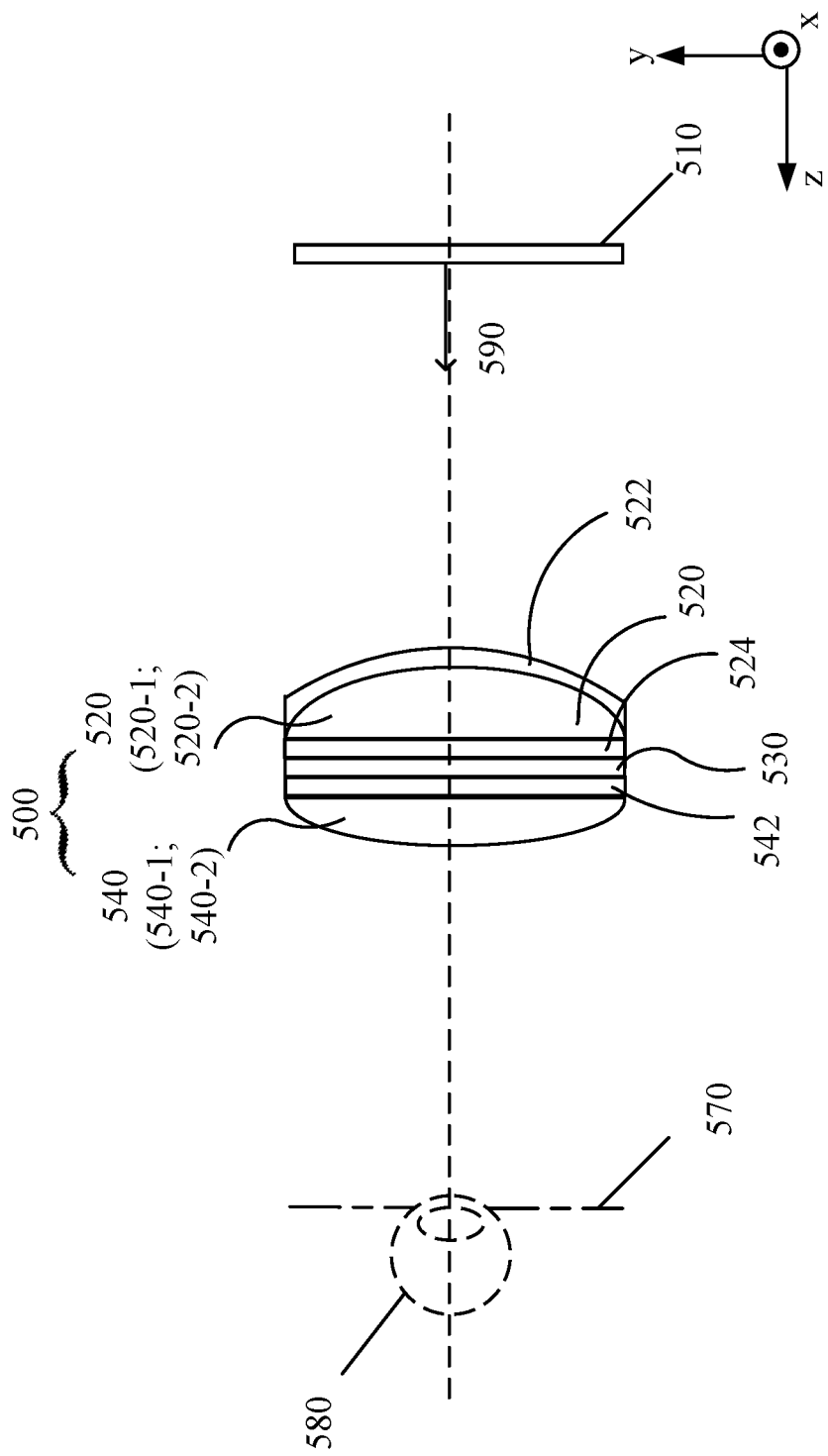
FIG. 5 schematically illustrates an implementation of the disclosed optical device in a pancake lens assembly, according to an embodiment of the disclosure.

FIG. 5 illustrates a schematic diagram of a pancake lens assembly or pancake lens 500 according to an embodiment of the disclosure. As shown in FIG. 5, the pancake lens assembly 500 may include a first optical element 520 and a second optical element 540 arranged in optical series. In some embodiments, the first optical element 520 and the second optical element 540 may be coupled together by an adhesive 530. The first optical element 520 may receive a light and output a light to the second optical element 540. The second optical element 540 coupled with the first optical element 520 may be configured to reflect a light of a first polarization received from the first optical element back to the first optical element, and transmit a light of a second polarization received from the first optical element.

In some embodiments, at least one (e.g., each) of the first optical element 520 and the second optical element 540 may include one or more optical lenses. The pancake lens 500 may be configured to receive an image light 590 emitted by an electrical display 510 (or a light source 510), alter one or more properties of the image light 590, and provide the image light 590 with altered properties to an eye 580 of a user located at an eye box 570. In some embodiments, the first optical element 520 may include a first surface 520-1 facing the electronic display 510 and configured to receive an image light from the electronic display 510. The first optical element 520 may also include a second surface 520-2 facing the eye 580 and configured to output an altered image light. The first optical element 520 may further include a mirror 522 and a waveplate 524, which may be separate films, layers, or coatings disposed at one or more surfaces of the first optical element 520. In some embodiments, the waveplate 524 may be disposed (e.g., bonded, formed, deposited, attached) at the second surface 520-2 of the first optical element 520, and the mirror 522 may be disposed (e.g., bonded, formed, deposited, attached) at the first surface 540-1 of the first optical element 520.

The mirror 522 may include a partial reflector that is partially reflective to reflect a portion of the received light. In some embodiments, the mirror 522 may be configured to transmit about 50% of an incident light and reflect about 50% of the incident light. Such a mirror is often referred to as a 50/50 mirror. In some embodiments, the waveplate 524 may include a quarter-wave plate ("QWP") configured to alter the polarization of a received light. A quarter-wave plate includes a polarization axis, and the polarization axis of the QWP may be oriented relative to a linearly polarized incident light to convert the linearly polarized light into a circularly polarized light for a visible spectrum and/or infrared spectrum. In some embodiments, the QWP may convert a circularly polarized light into a linearly polarized light. In some embodiments, the waveplate 524 may include a QWP according to any one of embodiments of the disclosed achromatic quarter-wave plates, such as optical devices 100, 200, or 300.

The second optical element 540 may have a first surface 540-1 facing the first optical element 520 and an opposing second surface 540-2 facing the eye 580. The pancake lens 500 may include a reflective polarizer 542, which may be an individual film, layer, or coating. In some embodiments, the reflective polarizer 542 may be disposed (e.g., bonded, formed, deposited, attached) at the first surface 540-1 or the second surface 540-2 of the second optical element 540. In one embodiment, as shown in FIG. 5, the reflective polarizer 542 may be disposed (e.g., bonded, formed, deposited, attached) at the first surface 540-1 of the second optical element 540.

The reflective polarizer 542 may be a partially reflective mirror configured to reflect a received light of a first linear polarization and transmit a received light of a second linear polarization. For example, the reflective polarizer 542 may reflect light polarized in a blocking direction (e.g., x-axis direction), and transmit light polarized in a perpendicular direction (e.g., y-axis direction). In the disclosed embodiments, the blocking direction is referred as a direction of a blocking axis or a blocking axis direction of the reflective polarizer 542, and the perpendicular direction is referred as a direction of a transmission axis or a transmission axis direction of the reflective polarizer 542.

The schematic configuration of the pancake lens assembly 500 shown in FIG. 5 is for illustrative purposes. In some embodiments, one or more of the first surface 520-1 and the second surface 520-2 of the first optical element 520 and the first surface 540-1 and the second surface 540-2 of the second optical element 540 may be flat or curved. The locations where the mirror 522, the waveplate 524, and the reflective polarizer 542 are disposed are for illustrative purposes only. The mirror 522, the waveplate 524, and the reflective polarizer 542 may be disposed at other locations in the pancake lens 500. In addition, the sequence in which the mirror 522, the first optical element 520, the waveplate 524, the adhesive 530, the reflective polarizer 542, and the second optical element 540 are arranged in the optical series is for illustrative purposes only. Other sequence may be adopted. In some embodiments, the pancake lens assembly 500 may have one optical element or more than two optical elements. In some embodiments, the pancake lens assembly 500 may further include other optical elements in addition to the first and second optical elements, such as a linear polarizer, a quarter-wave plate, which is not limited by the present disclosure. In some embodiments, the quarter-wave plate may be any one of the embodiments of the disclosed achromatic quarter-wave plates. With the disclosed achromatic quarter-wave plates, the chromatic aberration may be suppressed by the pancake lens assembly, the image quality provided by the pancake lens assembly may be improved.

Further, to produce a large FOV, optical elements in the pancake lens assembly often have a high optical curvature. However, traditional waveplates are typically flat. Attaching flat waveplates on the optical elements of high curvature in the pancake lens assembly may be difficult due to challenges associated with laminating a flat film on a curved surface. Thus, the design freedom of a conventional pancake lens assembly may be limited. The disclosed optical device fabricated based on LCP coatings, for example, a disclosed achromatic quarter-wave plate, may be fabricated on a curved substrate surface, thereby providing an additional degree of freedom in pancake lens design for AR/VR/MR NEDs, through which large FOV and compact pancake lenses may be realized. Accordingly, complex imaging functions, a small form factor, a large FOV, and/or a large eye-box may be achieved in AR/VR/MR NEDs.

Figure 6:
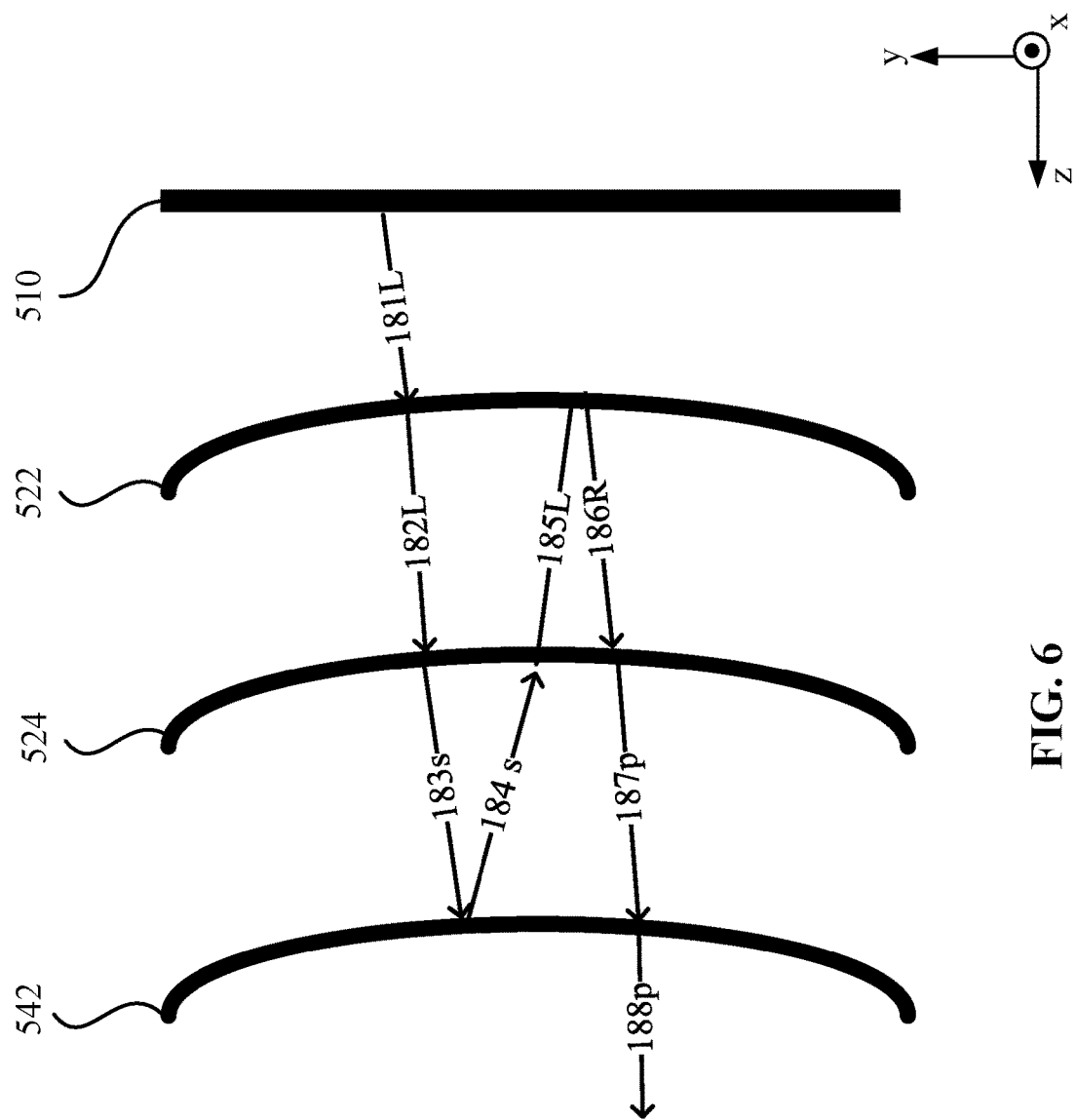
FIG. 6 schematically illustrates an optical path of the pancake lens assembly shown in FIG. 5, according to an embodiment of the disclosure.

FIG. 6 illustrates a schematic of a light propagation path 600 in the pancake lens assembly 500 shown in FIG. 5. In FIG. 6, "s" denotes s-polarized light, "p" denotes p-polarized light, "R" denotes right-handed circularly polarized light, and "L" denotes left-handed circularly polarized light. In the light propagation path 600, the first optical element 520 and the second optical element 540, which are presumed to be optical lenses that may not affect the polarization of the light, are omitted for simplicity of the illustration. In one embodiment, as shown in FIG. 6, a light 181 emitted from the electronic display 510 may be left-handed circularly polarized light ("181L") and transmitted to the mirror 522. At the mirror 522, a first portion of the left-handed circularly polarized light 181 ("181L") may be reflected by the mirror 522, and a second portion of the left-handed circularly polarized light 181 ("181L") may be transmitted by the mirror as a light 182 propagating towards the waveplate 524. The light 182 transmitted through the mirror 522 may remain as a left-handed circularly polarized light ("182L"). The waveplate 524 may be a quarter-wave plate, which may convert the left-handed circularly polarized light 182 ("182L") into an s-polarized light 183 ("183s").

The s-polarized light 183 ("183s") may be incident on the reflective polarizer 542, which may reflect a light polarized in a blocking direction (e.g., x-axis direction), and transmit a light polarized in a perpendicular direction (e.g., y-axis direction). That is, the reflective polarizer 542 may transmit a p-polarized light and reflect an s-polarized light. Thus, the s-polarized light 183 ("183s") propagating in the positive z-direction from the waveplate 524 may be reflected by the reflective polarizer 542 to be an s-polarized light 184 ("184s") propagating in the negative z-direction. The reflected s-polarized light 184 ("184s") may be transmitted through the waveplate 524 for a second time and converted into a left-handed circularly polarized light 185 ("185L") propagating in the negative z-direction. The left-handed circularly polarized light 185 ("185L") propagating in the negative z-direction may be reflect by the mirror 522 to be a right-handed circularly polarized light 186 ("186R"). The right-handed circularly polarized light 186 ("186R") may be transmitted through the waveplate 524 and converted into a p-polarized light 187 ("187p"). Because the reflective polarizer 542 may transmit a p-polarized light and reflect an s-polarized light, the p-polarized light 187 ("187p") may be transmitted through the reflective polarizer 542 as a p-polarized light 188 ("188p"), which may be focused to the eye-box.

For illustrative purposes, a left-handed circularly polarized light 181 emitted from the electronic display 510 is used as an example. In some embodiments, the light emitted from the electronic display 510 may be a right-handed circularly polarized light. In some embodiments, the light emitted from the electronic display 510 may be a linearly polarized light, and a quarter-wave plate may be arranged between the electronic display 510 and the mirror 522, or disposed at a surface of the mirror 522, to convert the linearly polarized light into a circularly polarized light, which is then incident onto the mirror 522. In some embodiments, the light emitted from the electronic display 510 may be an unpolarized light, and a linear polarizer and a quarter-wave plate may be arranged between the electronic display 510 and the mirror 522, or disposed at a surface of the mirror 522. The linear polarizer may convert the unpolarized light emitted from the electronic display 510 into a linearly polarized light, and the quarter-wave plate may be orientated relative to the linear polarizer to convert the linearly polarized light received from the linear polarizer into a circularly polarized light, which is then incident onto the mirror 522.

The above-mentioned applications of the optical device fabricated based on LCP coatings in the NEDs are for illustrative purposes. In addition, the disclosed optical device fabricated based on LCP coatings may be used to realize eye-tracking components, display resolution enhancement components (e.g., for increasing pixel density), and pupil steering elements, etc. The optical device fabricated based on LCP coatings may be implemented as multifunctional optical components in the NEDs to significantly improve the optical performance of the NEDs.

Figure 7:
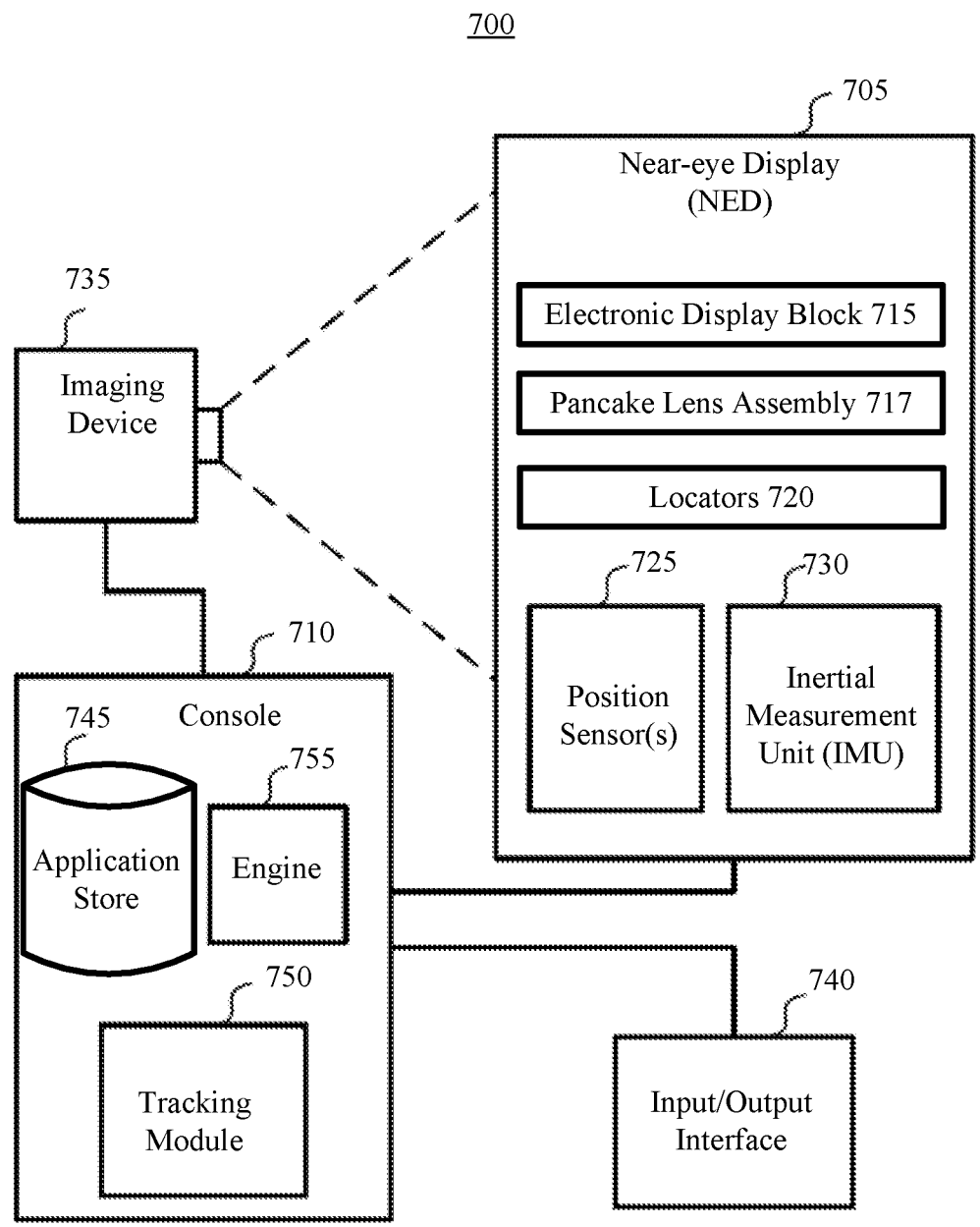
FIG. 7 illustrates a schematic block diagram of a system according to an embodiment of the disclosure.

FIG. 7 shows a block diagram of a system 700 according to an embodiment of the disclosure. As shown in FIG. 7, the system 700 may include an NED 705, a console 710, an imaging device 735, and an input/output interface 740. The NED 705, the imaging device 735, and the input/output interface 740 may be coupled to the console 710. Although FIG. 7 shows that the system 700 includes one NED 705, one imaging device 735, and one input/output interface 740, in some embodiments, any other suitable number of components may be included in the system 700. For example, the system 700 may include multiple NEDs 705 each having an associated input/output interface 740 and one or more imaging devices 735. In some embodiments, each NED 705, input/output interface 740, and imaging device 735 may communicate with the console 710. In some embodiments, different and/or additional components may be included in the system 700. The system 700 may operate in a VR system environment, an AR system environment, an MR system environment, or some combination thereof.

The NED 705 may be a head-mounted display configured to present media content to a user. Examples of media content presented by the NED 705 include one or more images, videos, audios, or some combination thereof. In some embodiments, audios may be presented via an external device (e.g., speakers and/or headphones) configured to receive audio information from the NED 705, the console 710, or both. The external device may present audio data based on the received audio information. An example of the NED 705 is further described below with reference to FIGS. 8A and 8B.

The NED 705 may include one or more bodies, which may be rigidly or non-rigidly coupled to each other. A rigid coupling between rigid bodies may cause the coupled rigid bodies to act as a single rigid entity. In contrast, a non-rigid coupling between rigid bodies may allow the rigid bodies to move relative to each other. In some embodiments, the NED 705 may present VR, AR, MR contents, or some combination thereof to the user. In the VR, AR and/or MR environments, the NED 705 may augment views of a physical, real-world environment with computer-generated elements (e.g., images, video, sound, etc.).

As shown in FIG. 7, the NED 705 may include an electronic display block 715, a pancake lens assembly 717, one or more locators 720, one or more position sensors 725, and an inertial measurement unit ("IMU") 730. The electronic display block 715 may display images to the user in accordance with data received from the console 710. In some embodiments, the electronic display block 715 may include an electronic display and an optics block. The electronic display may generate an image light. In some embodiments, the electronic display may include a single electronic display or multiple electronic displays (e.g., a display for each eye of a user). Examples of the electronic display may include: a liquid crystal display ("LCD"), an organic light emitting diode ("OLED") display, an activematrix organic light-emitting diode display ("AMOLED"), a transparent organic light emitting diode display ("TOLED"), some other display, a projector, or a combination thereof.

The optics block may include combinations of different optical elements. An optical element may be an aperture, a Fresnel lens, a convex lens, a concave lens, a filter, or any other suitable optical element that may affect the image light emitted from the electronic display. In some embodiments, one or more of the optical elements in the optics block may have one or more coatings, such as anti-reflective coatings. Magnification of the image light by the optics block may allow elements of the electronic display to have reduced sizes, reduced weight, and consume less power than larger displays. Additionally, magnification may increase a field of view of the displayed media content. For example, the field of view of the displayed media content may be widened or increased, such that the displayed media content may be presented using a significant portion of the field of view of the user (e.g., 150 degrees diagonal). In some embodiments, the optics block may be configured to have an effective focal length larger than the spacing to the electronic display, thereby magnifying the image light projected by the electronic display. Additionally, in some embodiments, the amount of magnification may be adjusted by adding or removing optical elements.

The pancake lens assembly 717 may include any one of the disclosed quarter-wave plate, such as optical device 100, 200, or 300. In some embodiments, the pancake lens assembly 717 may be configured as a monolithic pancake lens assembly without any air gap between optical elements of the pancake lens assembly. For example, the pancake lens assembly 717 may be an embodiment of the pancake lens assembly 500. The pancake lens assembly 717 may also magnify an image light received from the electronic display, correct optical aberrations associated with the image light, such that the corrected image light may be presented to a user of the NED 705.

The locators 720 may be objects located at various positions on the NED 705 relative to one another and relative to a specific reference point on the NED 705. A locator 720 may be a light emitting diode ("LED"), a corner cube reflector, a reflective marker, a type of light source that contrasts with an environment in which the NED 705 operates, or a combination thereof. In some embodiments, when the locators 720 may be active (i.e., an LED or other type of light-emitting device) elements, the locators 720 may emit lights in the visible band (e.g., about 380 nm to about 750 nm), in the infrared ("IR") band (e.g., about 750 nm to about 5 mm), in the ultraviolet band (e.g., about 50 nm to about 380 nm), any other suitable portion of the electromagnetic spectrum, or a combination thereof.

In some embodiments, the locators 720 may be located beneath an outer surface of the NED 705, which may be transparent to the light emitted from or reflected by the locators 720. In some embodiments, the locators 720 may be sufficiently thin to not substantially attenuate the wavelengths of the light emitted from or reflected by the locators 720. In some embodiments, the outer surface or other portions of the NED 705 may be opaque in the visible band. Thus, the locators 720 may emit lights in the IR band under an outer surface that may be transparent in the IR band but opaque in the visible band.

The IMU 730 may be an electronic device configured to generate fast calibration data based on measurement signals received from one or more of the position sensors 725. A position sensor 725 may generate one or more measurement signals in response to the motion of the NED 705. Examples of the position sensors 725 may include: one or more accelerometers, one or more gyroscopes, one or more magnetometers, another suitable type of sensor that detects motion, a sensor configured for error correction of the IMU 730, or one or more combinations thereof. The position sensors 725 may be located external to the IMU 730, internal to the IMU 730, or a combination thereof.

Based on the one or more measurement signals from one or more position sensors 725, the IMU 730 may generate fast calibration data indicating an estimated position of the NED 705 relative to an initial position of the NED 705. For example, the position sensors 725 may include multiple accelerometers to measure translational motions (forward/back, up/down, left/right) and multiple gyroscopes to measure rotational motions (e.g., pitch, yaw, roll). In some embodiments, the IMU 730 may rapidly sample the measurement signals and calculate the estimated position of the NED 705 from the sampled data. For example, the IMU 730 may integrate the measurement signals received from the accelerometers over time to estimate a velocity vector and integrate the velocity vector over time to determine an estimated position of a reference point on the NED 705. In some embodiments, the IMU 730 may provide the sampled measurement signals to the console 710, which may determine the fast calibration data. The reference point may be a point that may be used to describe the position of the NED 705. While the reference point may generally be defined as a point in space, in some embodiments, the reference point may be defined as a point within the NED 705 (e.g., a center of the IMU 730).

The IMU 730 may receive one or more calibration parameters from the console 710. As discussed below, the one or more calibration parameters may be used to maintain tracking of the NED 705. Based on a received calibration parameter, the IMU 730 may adjust one or more IMU parameters (e.g., a sampling rate). In some embodiments, one or more calibration parameters may cause the IMU 730 to update an initial position of the reference point, the initial position corresponds to a next calibrated position of the reference point. Updating the initial position of the reference point as the next calibrated position of the reference point may help reduce accumulated errors associated with the determined estimated position. The accumulated errors, also referred to as drift errors, may cause the estimated position of the reference point to "drift" away from the actual position of the reference point over time.

The imaging device 735 may generate slow calibration data in accordance with calibration parameters received from the console 710. Slow calibration data may include one or more images showing observed positions of the locators 720 that may be detectable by the imaging device 735. The imaging device 735 may include one or more photo cameras, one or more video cameras, any other device capable of capturing images including one or more of the locators 720, or some combination thereof. Additionally, the imaging device 735 may include one or more filters (e.g., for increasing signal to noise ratio). The imaging device 735 may be configured to detect lights emitted or reflected from locators 720 in a field of view of the imaging device 735.

In some embodiments, when the locators 720 include passive elements (e.g., a retroreflector), the imaging device 735 may include a light source that illuminates some or all of the locators 720, which retro-reflect the light towards the light source in the imaging device 735. Slow calibration data may be communicated from the imaging device 735 to the console 710, and the imaging device 735 may receive one or more calibration parameters from the console 710 to adjust one or more imaging parameters (e.g., focal length, focus, frame rate, ISO, sensor temperature, shutter speed, aperture, etc.).

The input/output interface 740 may be a device configured to receive an input from a user, such as an action request to the console 710, or to output data received from the console 710. An action request may be a request to perform a particular action. For example, an action request may be to start or end an application or to perform a particular action within the application. The input/output interface 740 may include one or more input devices and/or output devices. Example input devices may include: a keyboard, a mouse, a game controller, or any other suitable device for receiving action requests and communicating the received action requests to the console 710. The output devices may include a data transfer port, a display, an video/audio player, etc. An action request received by the input/output interface 740 may be communicated to the console 710, which may perform an action corresponding to the action request. In some embodiments, the input/output interface 740 may provide haptic feedback to the user in accordance with instructions received from the console 710. For example, haptic feedback may be provided when an action request is received, or the console 710 may communicate instructions to the input/output interface 740 causing the input/output interface 740 to generate haptic feedback when the console 710 performs an action.

The console 710 may provide media content to the NED 705 for presenting to the user in accordance with information received from one or more of: the imaging device 735, the NED 705, and the input/output interface 740. In some embodiments, as shown in FIG. 7, the console 710 may include an application store 745, a tracking module 750, and a virtual reality ("VR") engine 755. In some embodiments, the console 710 may include modules different from those shown in FIG. 7. The functions further described below may be distributed among components of the console 710 in a manner different from the manner described herein.

The application store 745 may store one or more applications for execution by the console 710. An application may be a group of instructions, which when executed by a processor, may generate content for presenting to the user. Content may be generated by an application in response to inputs received from the user via movement of the NED 705 or the input/output interface 740. Examples of applications may include gaming applications, conferencing applications, video playback application, or other suitable applications.

The tracking module 750 may calibrate the system 700 using one or more calibration parameters and may adjust one or more calibration parameters to reduce errors in determination of the position of the NED 705. For example, the tracking module 750 may adjust the focus of the imaging device 735 to obtain a more accurate position for observed locators on the NED 705. Moreover, calibration performed by the tracking module 750 may also account for information received from the IMU 730. Additionally, when tracking of the NED 705 is lost (e.g., when the imaging device 735 loses line of sight of at least a threshold number of the locators 720), the tracking module 750 may re-calibrate portions of or the entire system 700.

The tracking module 750 may track movements of the NED 705 based on slow calibration data or information from the imaging device 735. The tracking module 750 may determine positions of a reference point of the NED 705 based on observed locators 720 from the slow calibration information and a model of the NED 705. The tracking module 750 may also determine positions of a reference point of the NED 705 based on position information from the fast calibration data or information. Additionally, in some embodiments, the tracking module 750 may use portions of the fast calibration information, the slow calibration information, or some combination thereof, to predict a future location of the NED 705. The tracking module 750 may provide the estimated or predicted future position of the NED 705 to the engine 755.

The engine 755 may execute applications within the system 700 and receive position information, acceleration information, velocity information, predicted future positions, or some combination thereof of the NED 705 from the tracking module 750. Based on the received information, the engine 755 may determine content to provide to the NED 705 for presenting to the user. For example, when the received information indicates that the user looks to the left, the engine 755 may generate content for the NED 705 that mirrors the user's movement in a virtual environment. Additionally, the engine 755 may perform an action within an application executing on the console 710 in response to an action request received from the input/output interface 740, and provide feedback to the user that the action was performed. The provided feedback may be visual or audible feedback via the NED 705 or haptic feedback via the input/output interface 740.

Figure 8A:
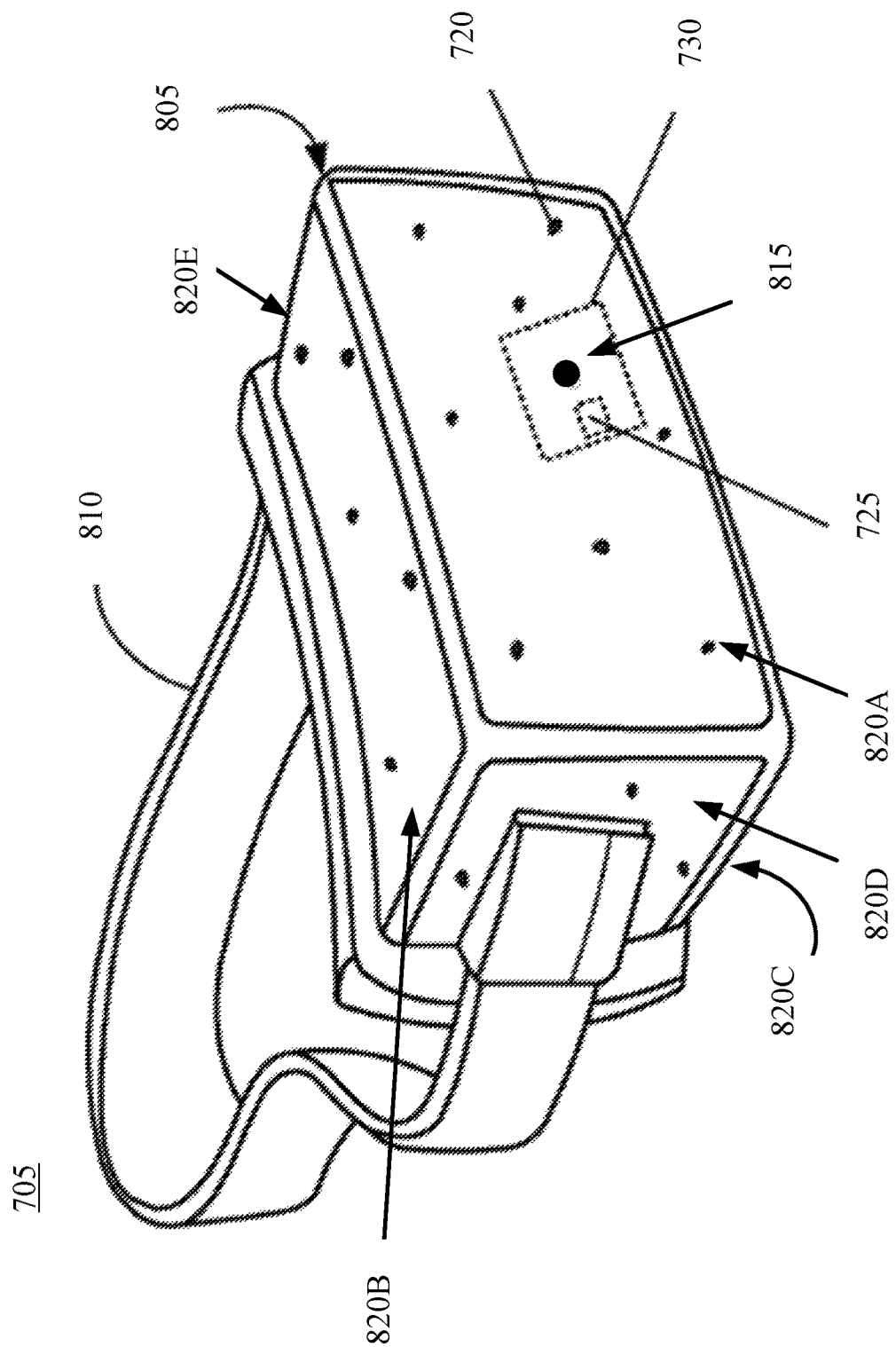
FIG. 8A illustrates a schematic diagram of a near-eye display ("NED") shown in FIG. 7, according to an embodiment of the disclosure.

FIG. 8A illustrates a diagram of the NED 705 shown in FIG. 7. Referring to FIG. 8A and FIG. 7, the NED 705 may include a front body 805 and a band 810. The front body 805 may include one or more electronic display elements of the electronic display and optics block (not shown in FIG. 8A), the IMU 730, the one or more position sensors 725, and the locators 720. In the embodiment shown in FIG. 8A, the position sensors 725 may be located within the IMU 730. In some embodiments, neither the IMU 730 nor the position sensors 725 may be visible to the user.

The locators 720 may be located at fixed positions on the front body 805 relative to one another and relative to a reference point 815. In the embodiment shown in FIG. 8A, the reference point 815 may be located at the center of the IMU 730. Each of the locators 720 may emit lights that may be detectable by the imaging device 735. The locators 720, or some of the locators 720, may be located on a front side 820A, a top side 820B, a bottom side 820C, a right side 820D, and a left side 820E of the front rigid body 805.

Figure 8B:
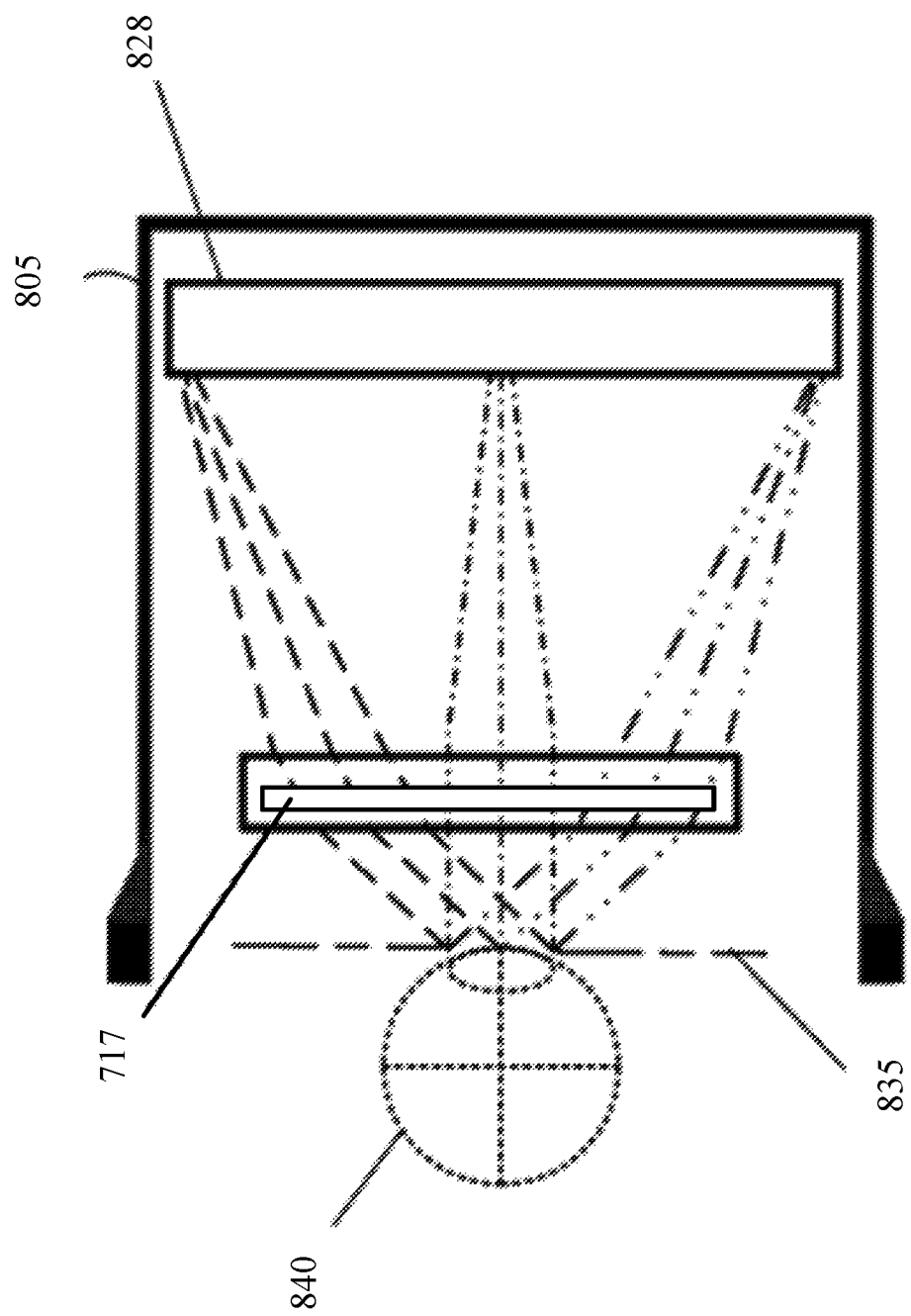
FIG. 8B is a schematic cross-sectional view of a front body of the NED shown in FIG. 8A, according to an embodiment of the disclosure.

FIG. 8B is a cross-sectional view of the front body 805 of the NED 705 shown in FIG. 8A. As shown in FIG. 8B, the front body 805 may include the electronic display 828 and the pancake lens assembly 717 configured to provide an altered image light to an exit pupil 835. The exit pupil 835 may be at a location of the front body 805 where an eye 840 of the user may be positioned. For illustrative purposes, FIG. 8B shows a cross-section of the front body 805 associated with a single eye 840. Another similar electronic display, separate from the electronic display 828, may provide image light altered by the optics block to another eye of the user.

The term "processor" used herein may encompass any suitable processor, such as a central processing unit ("CPU"), a graphics processing unit ("GPU"), an application-specific integrated circuit ("ASIC"), a programmable logic device ("PLD"), or a combination thereof. Other processors not listed above may also be used. A processor may be implemented as software, hardware, firmware, or a combination thereof.

The term "controller" may encompass any suitable electrical circuit, software, or processor configured to generate a control signal for controlling a device, a circuit, an optical element, etc. A "controller" may be implemented as software, hardware, firmware, or a combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("ROM"), a flash memory, etc.

The term "unit," "sub-unit," or "module" may encompass a hardware component, a software component, or a combination thereof. For example, a "unit," "sub-unit," or "module" may include a housing, a device, a sensor, a processor, an algorithm, a circuit, an electrical or mechanical connector, etc.

Some portions of this description may describe the embodiments of the disclosure in terms of algorithms and symbolic representations of operations on information. These operations, while described functionally, computationally, or logically, may be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Embodiments of the disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment. Such combinations of different features shown in different drawings are also within the scope of the present disclosure.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. An optical waveplate, comprising:
a first birefringent film including optically anisotropic molecules arranged to form a first twist structure;
a second birefringent film stacked with the first birefringent film and including optically anisotropic molecules arranged to form a second twist structure; and
a third birefringent film stacked with the first birefringent film and the second birefringent film, the third birefringent film including optically anisotropic molecules arranged to form a third twist structure,
wherein the optically anisotropic molecules at a first portion of the first birefringent film adjacent an interface between the first birefringent film and the second birefringent film are configured with a first azimuthal angle,
wherein the optically anisotropic molecules at a second portion of the second birefringent film adjacent the interface are configured with a second azimuthal angle,
wherein the first azimuthal angle is substantially the same as the second azimuthal angle,
wherein the optical waveplate is configured to provide a substantially constant retardance over a design wavelength range, and
wherein for a substantially normally incident light having a design wavelength that is a center wavelength of the design wavelength range, at least one of the first birefringent film, the second birefringent film, or the third birefringent film is configured to provide a quarter-wave retardance or a half-wave retardance.

2. The optical waveplate of claim 1, wherein at least one of the first twist structure or the second twist structure is an in-plane twist structure.

3. The optical waveplate of claim 1, wherein at least one of the first birefringent film, the second birefringent film, or the third birefringent film includes one or more liquid crystal polymer films.

4. The optical waveplate of claim 1, wherein
the substantially constant retardance over the design wavelength range is a quarter-wave retardance or a half-wave retardance for the substantially normally incident light having the design wavelength that is the center wavelength of the design wavelength range, and
at least one of the first birefringent film, the second birefringent film, or the third birefringent film is configured to provide a retardance other than the quarter-wave retardance or the half-wave retardance for the substantially normally incident light.

5. The optical waveplate of claim 1, wherein the design wavelength range is from about 400 nm to about 700 nm.

6. The optical waveplate of claim 1, wherein the first birefringent film and the second birefringent film are configured with different twist angles per unit thickness.

7. An optical waveplate, comprising:
a first birefringent film configured with a first optic axis having a first spatially constant orientation;
a second birefringent film configured with a second optic axis having a second spatially constant orientation; and
a third birefringent film configured with a third optic axis having a third spatially constant orientation,
wherein the first birefringent film, the second birefringent film, and the third birefringent film are stacked together to form a stack, and the stack provides a substantially constant retardance over a design wavelength range to an input light having a wavelength within the design wavelength range while transmitting the input light,
wherein the design wavelength range includes at least from 500 nm to 600 nm, and
wherein the first spatially constant orientation, the second spatially constant orientation, and the third spatially constant orientation are different from one another.

8. The optical waveplate of claim 7, wherein
the first spatially constant orientation corresponds to a first constant azimuthal angle of optically anisotropic molecules of the first birefringent film with respect to a predetermined reference direction,
the second spatially constant orientation corresponds to a second constant azimuthal angle of optically anisotropic molecules of the second birefringent film with respect to the predetermined reference direction, and
the third spatially constant orientation corresponds to a third constant azimuthal angle of optically anisotropic molecules of the third birefringent film with respect to the predetermined reference direction.

9. The optical waveplate of claim 8, further comprising:
a first photo-alignment material film coupled with the first birefringent film and configured to at least partially align the optically anisotropic molecules of the first birefringent film in the first constant azimuthal angle;
a second photo-alignment material film coupled with the second birefringent film and configured to at least partially align the optically anisotropic molecules of the second birefringent film in the second constant azimuthal angle; and
a third photo-alignment material film coupled with the third birefringent film and configured to at least partially align the optically anisotropic molecules of the third birefringent film in the third constant azimuthal angle.

10. The optical waveplate of claim 7, wherein at least one of the first birefringent film, the second birefringent film, or the third birefringent film includes one or more liquid crystal polymer films.

11. The optical waveplate of claim 7, wherein
the substantially constant retardance over the design wavelength range is a quarter-wave retardance or a half-wave retardance for a substantially normally incident light having a design wavelength in the design wavelength range, and
at least one of the first birefringent film, the second birefringent film, or the third birefringent film is configured to provide a retardance other than the quarter-wave retardance or the half-wave retardance for the substantially normally incident light having the design wavelength.

12. The optical waveplate of claim 11, wherein the design wavelength is a center wavelength of the design wavelength range.

13. The optical waveplate of claim 7, wherein the design wavelength range also includes from 400 nm to 500 nm and from 600 nm to 700 nm.

14. The optical waveplate of claim 7, wherein at least two of the first birefringent film, the second birefringent film, and the third birefringent film each provide a retardance that does not correspond to a half-wave retardance or a quarter-wave retardance.

15. The optical waveplate of claim 7, wherein the design wavelength range has a bandwidth of 280 nm or greater.

16. An optical lens assembly, comprising:
a first optical element; and
a second optical element optically coupled to the first optical element and configured to reflect a light of a first polarization received from the first optical element back to the first optical element, and transmit a light of a second polarization received from the first optical element,
wherein at least one of the first optical element or the second optical element is provided with a waveplate comprising:
a first birefringent film configured with a first optic axis having a first spatially constant orientation;
a second birefringent film configured with a second optic axis having a second spatially constant orientation; and
a third birefringent film configured with a third optic axis having a third spatially constant orientation,
wherein the first birefringent film, the second birefringent film, and the third birefringent film are stacked together to form a stack, and the stack provides a substantially constant retardance over a design wavelength range to an input light having a wavelength within the design wavelength range while transmitting the input light,
wherein the design wavelength range includes at least from 500 nm to 600 nm, and
wherein the first spatially constant orientation, the second spatially constant orientation, and the third spatially constant orientation are different from one another.

17. The optical lens assembly of claim 16, wherein:
the first spatially constant orientation corresponds to a first constant azimuthal angle of optically anisotropic molecules of the first birefringent film with respect to a predetermined reference direction, the second spatially constant orientation corresponds to a second constant azimuthal angle of optically anisotropic molecules of the second birefringent film with respect to the predetermined reference direction, and the third spatially constant orientation corresponds to a third constant azimuthal angle of optically anisotropic molecules of the third birefringent film with respect to the predetermined reference direction.

18. The optical lens assembly of claim 16, wherein at least one of the first birefringent film, the second birefringent film, or the third birefringent film includes one or more liquid crystal polymer films.

\* \* \* \* \*